United States Patent
Fukumitsu et al.

(10) Patent No.: US 11,930,143 B2
(45) Date of Patent: Mar. 12, 2024

(54) IMAGE READING APPARATUS AND CONTROL METHOD OF IMAGE READING APPARATUS FOR CONTROLLING OUTPUT MODES AND IMAGE READING SPEED

(71) Applicant: SEIKO EPSON CORPORATION, Tokyo (JP)

(72) Inventors: Yasunori Fukumitsu, Kitakyushu (JP); Masahiko Mizoguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/174,194

(22) Filed: Feb. 24, 2023

(65) Prior Publication Data

US 2023/0276006 A1    Aug. 31, 2023

(30) Foreign Application Priority Data

Feb. 25, 2022 (JP) .................... 2022-027745
Feb. 25, 2022 (JP) .................... 2022-027746
Feb. 25, 2022 (JP) .................... 2022-027747

(51) Int. Cl.
*H04N 1/00*    (2006.01)

(52) U.S. Cl.
CPC ..... *H04N 1/00896* (2013.01); *H04N 1/00013* (2013.01); *H04N 1/00604* (2013.01); *H04N 1/00663* (2013.01); *H04N 1/00801* (2013.01); *H04N 1/00965* (2013.01); *H04N 1/00519* (2013.01)

(58) Field of Classification Search
None
See application file for complete search history.

(56) References Cited

U.S. PATENT DOCUMENTS

2016/0034026 A1*   2/2016   Hanayama ............ G06F 1/3206
                                                  713/323
2016/0316087 A1* 10/2016 Hanayama ......... H04N 1/00037

FOREIGN PATENT DOCUMENTS

JP         2016-032239 A      3/2016

* cited by examiner

*Primary Examiner* — Andrew H Lam
(74) *Attorney, Agent, or Firm* — WORKMAN NYDEGGER

(57) ABSTRACT

There is provided an image reading apparatus in which a low output mode is a mode that can be controlled in a coupling state where a low power-feeding USB device is coupled, a high output mode is a mode that can be controlled in a coupling state where a high power-feeding USB device capable of feeding power higher than the low power-feeding USB device is coupled, and a control section does not perform image reading at a second reading speed faster than a first reading speed and performs image reading at the first reading speed in the low output mode.

18 Claims, 13 Drawing Sheets

FIG. 4

| CONTROL CONTENTS | | MODE | | |
|---|---|---|---|---|
| | | HIGH OUTPUT | MEDIUM OUTPUT | LOW OUTPUT |
| CONTROL SECTION POWER CONSUMPTION | | NORMAL | LOW | LOWEST |
| READING SPEED | 40 ppm | Y | N | N |
| | 30 ppm | Y | Y | N |
| | 5 ppm | Y | Y | Y |
| READING CONTROL CLOCK | | NORMAL | LOW | LOW |
| DOCUMENT TYPE | THIN PAPER | Y | Y | Y |
| | THICK PAPER | Y | N | N |
| CARRIER SHEET | | Y | Y | N |
| DOUBLE FEED DETECTION | | Y | N | N |
| DOCUMENT PROTECTION | | Y | Y | N |
| POSTURE DRIVE | | Y | Y | N |
| TRAY DRIVE | | Y | N | N |
| FIRST WIRELESS COMMUNICATION | NORMAL | Y | Y | N |
| | IN READING | Y | N | N |
| SECOND WIRELESS COMMUNICATION | NORMAL | Y | Y | Y |
| | IN READING | Y | Y | N |
| WIRED COMMUNICATION | | Y | Y | Y |
| LIQUID CRYSTAL DISPLAY | | Y | Y | N |
| TOUCH PANEL | | Y | Y | N |
| USB MEMORY | | Y | N | N |
| SENSOR TIME DIVISION CONTROL | | N | Y | Y |

FIG. 10A

| CURRENT STATE | | COUPLING STATE | | | | | CONTROL CONTENTS | | | POWER SUPPLY SOURCE |
|---|---|---|---|---|---|---|---|---|---|---|
| MODE | READING | AC ADAPTER | HIGH POWER-FEEDING USB | BATTERY | MEDIUM POWER-FEEDING USB | LOW POWER-FEEDING USB | READING | SYSTEM CONTROL | MODE | |
| HIGH OUTPUT | — | Y | — | — | — | — | — | CONTINUE | HIGH OUTPUT | AC ADAPTER |
| | N | N | Y | — | — | — | — | | | HIGH POWER-FEEDING USB |
| | | N | N | Y | — | — | — | RESTART | MEDIUM OUTPUT | BATTERY |
| | | N | N | N | Y | — | — | | | MEDIUM POWER-FEEDING USB |
| | | N | N | N | N | Y | — | | LOW OUTPUT | LOW POWER-FEEDING USB |
| | Y | N | N | Y | — | — | STOP | RESTART | MEDIUM OUTPUT | BATTERY |
| | | N | N | N | Y | — | | | | MEDIUM POWER-FEEDING USB |
| | | N | N | N | N | Y | | | LOW OUTPUT | LOW POWER-FEEDING USB |
| | — | N | N | N | N | N | — | SHUT DOWN | — | — |

FIG. 10B

| CURRENT STATE | | COUPLING STATE | | | | | CONTROL CONTENTS | | | |
|---|---|---|---|---|---|---|---|---|---|---|
| MODE | READING | AC ADAPTER | HIGH POWER-FEEDING USB | BATTERY | MEDIUM POWER-FEEDING USB | LOW POWER-FEEDING USB | READING | SYSTEM CONTROL | MODE | POWER SUPPLY SOURCE |
| READING | — | N | N | Y | — | — | — | CONTINUE | MEDIUM OUTPUT | BATTERY |
| READING | — | N | N | N | Y | — | — | CONTINUE | MEDIUM OUTPUT | MEDIUM POWER-FEEDING USB |
| READING | N | Y | — | Y | — | — | — | RESTART | HIGH OUTPUT | AC ADAPTER |
| READING | N | Y | — | — | Y | — | — | RESTART | HIGH OUTPUT | AC ADAPTER |
| READING | N | N | Y | Y | — | — | — | RESTART | HIGH OUTPUT | HIGH POWER-FEEDING USB |
| READING | N | N | Y | — | Y | — | — | RESTART | HIGH OUTPUT | HIGH POWER-FEEDING USB |
| READING | N | N | N | N | N | Y | — | — | LOW OUTPUT | LOW POWER-FEEDING USB |
| MEDIUM OUTPUT | Y | Y | — | Y | — | — | CONTINUE | RESTART | MEDIUM OUTPUT | AC ADAPTER |
| MEDIUM OUTPUT | Y | Y | — | — | Y | — | CONTINUE | RESTART | MEDIUM OUTPUT | AC ADAPTER |
| MEDIUM OUTPUT | Y | N | Y | Y | — | — | CONTINUE | RESTART | MEDIUM OUTPUT | HIGH POWER-FEEDING USB |
| MEDIUM OUTPUT | Y | N | Y | — | Y | — | CONTINUE | RESTART | MEDIUM OUTPUT | HIGH POWER-FEEDING USB |
| MEDIUM OUTPUT | Y | N | N | N | N | Y | STOP | — | LOW OUTPUT | LOW POWER-FEEDING USB |
| MEDIUM OUTPUT | — | N | N | N | N | N | — | SHUT DOWN | — | — |

FIG. 10C

| CURRENT STATE | | COUPLING STATE | | | | | CONTROL CONTENTS | | |
|---|---|---|---|---|---|---|---|---|---|
| MODE | READING | AC ADAPTER | HIGH POWER-FEEDING USB | BATTERY | MEDIUM POWER-FEEDING USB | LOW POWER-FEEDING USB | READING | SYSTEM CONTROL | MODE | POWER SUPPLY SOURCE |
| LOW OUTPUT | — | N | N | N | N | Y | — | CONTINUE | LOW OUTPUT | LOW POWER-FEEDING USB |
| LOW OUTPUT | N | Y | — | — | — | Y | — | RESTART | HIGH OUTPUT | AC ADAPTER |
| LOW OUTPUT | N | N | Y | — | — | Y | — | RESTART | HIGH OUTPUT | HIGH POWER-FEEDING USB |
| LOW OUTPUT | N | N | N | Y | — | Y | — | RESTART | MEDIUM OUTPUT | BATTERY |
| LOW OUTPUT | N | N | N | N | Y | Y | — | RESTART | MEDIUM OUTPUT | MEDIUM POWER-FEEDING USB |
| LOW OUTPUT | Y | Y | — | — | — | Y | CONTINUE | RESTART | HIGH OUTPUT | AC ADAPTER |
| LOW OUTPUT | Y | N | Y | — | — | Y | CONTINUE | RESTART | HIGH OUTPUT | HIGH POWER-FEEDING USB |
| LOW OUTPUT | Y | N | N | Y | — | Y | CONTINUE | RESTART | MEDIUM OUTPUT | BATTERY |
| LOW OUTPUT | Y | N | N | N | Y | Y | CONTINUE | RESTART | MEDIUM OUTPUT | MEDIUM POWER-FEEDING USB |
| LOW OUTPUT | — | N | N | N | N | N | — | SHUT DOWN | — | — |

IMAGE READING APPARATUS AND CONTROL METHOD OF IMAGE READING APPARATUS FOR CONTROLLING OUTPUT MODES AND IMAGE READING SPEED

The present application is based on, and claims priority from JP Application Serial Number 2022-027745, filed Feb. 25, 2022, JP Application Serial Number 2022-027746, filed Feb. 25, 2022, and JP Application Serial Number 2022-027747, filed Feb. 25, 2022, the disclosures of which are hereby incorporated by reference herein in their entirety.

BACKGROUND

1. Technical Field

The present disclosure relates to an image reading apparatus configured to read an image from an original document and a control method of the image reading apparatus.

2. Related Art

For example, JP-A-2016-32239 discloses an image reading apparatus that can be coupled to a USB device. In the image reading apparatus, power can be fed from the USB device by being coupled to the USB device such as a terminal device. Such an image reading apparatus can be controlled in any one of a plurality of types of modes having different power consumption by coupling with a USB device. The plurality of types of modes include a reference mode and a power saving mode with power consumption smaller than power consumption in the reference mode. The image reading apparatus can be controlled in the power saving mode when an image is not being read. When an instruction to read an image is issued while the image reading apparatus is controlled in the power saving mode, the image reading apparatus can be controlled in the reference mode.

However, in such an image reading apparatus, when an instruction to read an image is issued in a mode with small power consumption, the mode is transitioned to a mode with large power consumption. Therefore, the power consumption of the image reading apparatus increases. As described above, in the image reading apparatus, it is desired to implement a function related to image reading in accordance with power consumption.

SUMMARY

According to an aspect of the present disclosure, an image reading apparatus includes a reading section configured to read an image from an original document, and a control section configured to perform control related to image reading. The control section is configured to perform control in any one of a plurality of types of modes. The plurality of types of modes include a low output mode and a high output mode. The low output mode is a mode configured to be controlled in a coupling state where a low power-feeding USB device configured to feed power of a power value included within a low power range is coupled. The high output mode is a mode configured to be controlled in a coupling state where a high power-feeding USB device configured to feed power of a power value included within a high power range higher than the low power range is coupled. The reading section is configured to read an image at either a first reading speed or a second reading speed faster than the first reading speed. The control section is configured not to perform image reading at the second reading speed and to perform image reading at the first reading speed in the low output mode. The control section is configured to perform image reading at the first reading speed and the second reading speed in the high output mode.

According to another aspect of the present disclosure, there is provided a control method of an image reading apparatus including a reading section configured to read an image from an original document. The control method includes performing control in any one of a plurality of types of modes including a low output mode and a high output mode, the low output mode configured to be controlled in a coupling state where a low power-feeding USB device configured to feed power of a power value included within a low power range is coupled, and the high output mode configured to be controlled in a coupling state where a high power-feeding USB device configured to feed power of a power value included within a high power range higher than the low power range is coupled, performing image reading at a second reading speed faster than a first reading speed and performing image reading at the first reading speed in the low output mode, and performing image reading at the first reading speed and the second reading speed in the high output mode.

BRIEF DESCRIPTION OF THE DRAWINGS

FIG. 4 is a schematic diagram illustrating control contents in each of a plurality of types of modes.

FIGS. 10A to 10C are schematic diagrams illustrating a control table.

DESCRIPTION OF EXEMPLARY EMBODIMENTS

First Embodiment

Hereinafter, an image reading apparatus according to an embodiment will be described with reference to the drawings. The image reading apparatus is, for example, a sheet feed scanner in which a fixed reading section reads an original document such as paper or a film to be transported. The image reading apparatus is not limited to the sheet feed scanner, and may be a flatbed scanner.

Configuration of Image Reading Apparatus 11

Figure 1:
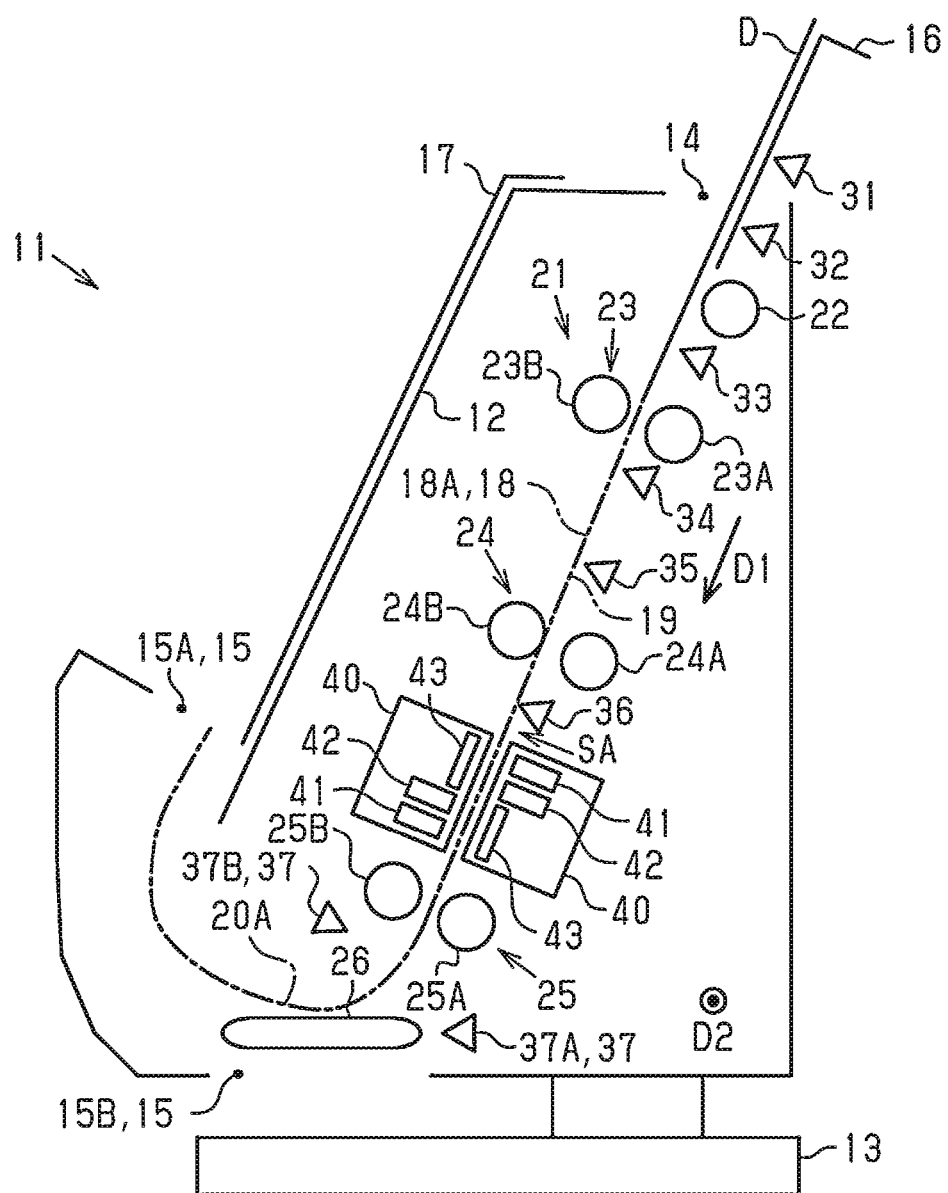
FIG. 1 is a side view illustrating an image reading apparatus at a first posture.
Figure 2:
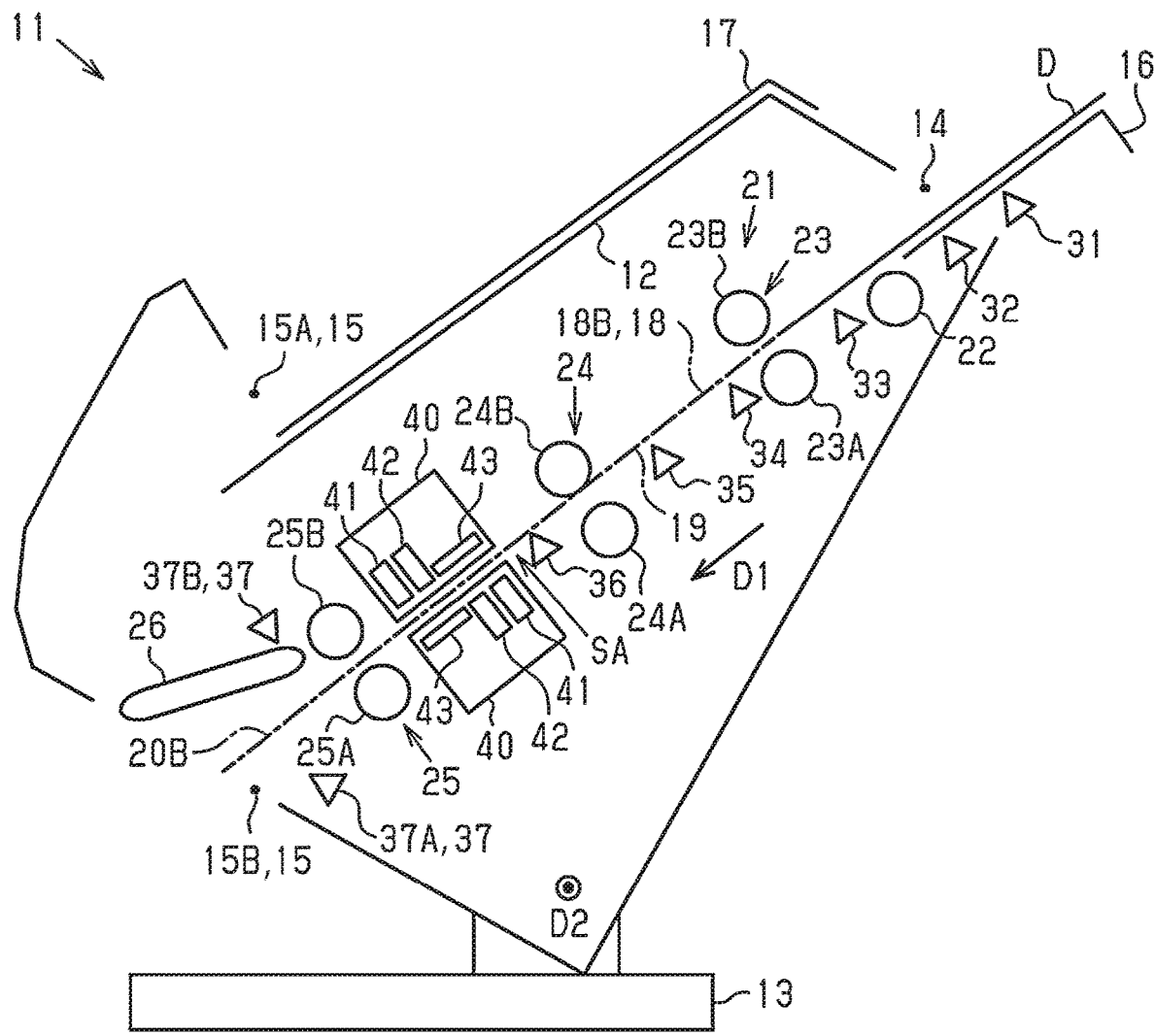
FIG. 2 is a side view illustrating the image reading apparatus at a second posture.

As illustrated in FIGS. 1 and 2, an image reading apparatus 11 includes a housing 12 and a base 13. The housing 12 is supported by the base 13. The base 13 is installed on a horizontal surface, for example. The housing 12 is configured to be rotatable with respect to the base 13.

The housing 12 is configured such that the posture can be switched. The housing 12 is configured to switch the posture, for example, by rotating with respect to the base 13. For example, the housing 12 performs switching between a first posture illustrated in FIG. 1 and a second posture illustrated in FIG. 2. The housing 12 is configured such that an inclination with respect to the base 13 changes depending on whether the housing 12 is at the first posture or the second posture. As described above, when the housing 12 is at the first posture, the image reading apparatus 11 can reduce a foot space of the image reading apparatus 11 as compared with the case where the housing 12 is at the second posture.

The housing 12 includes a supply port 14. The supply port 14 is an opening to which an original document D before reading is supplied. The housing 12 may include a plurality of discharge ports 15. The plurality of discharge ports 15 are openings from which the original document D after reading is discharged. The plurality of discharge ports 15 include a first discharge port 15A and a second discharge port 15B.

The image reading apparatus 11 includes a paper feed tray 16. The paper feed tray 16 extends from the inside of the housing 12 to the outside of the housing 12 through the supply port 14. The original document D before reading can be placed on the paper feed tray 16. The paper feed tray 16 can slide in a direction in which the original document D before reading is fed. The paper feed tray 16 corresponds to an example of a first tray.

The image reading apparatus 11 includes a paper discharge tray 17. The paper discharge tray 17 extends from the inside of the housing 12 to the outside of the housing 12 through the first discharge port 15A. The original document D after reading can be placed on the paper discharge tray 17. The paper discharge tray 17 can slide in a direction in which the original document D after reading is discharged. The paper discharge tray 17 corresponds to an example of a second tray.

The image reading apparatus 11 includes a transport path 18. The transport path 18 is a path through which the original document D is transported. The transport path 18 extends inside the housing 12. The image reading apparatus 11 includes, for example, a first transport path 18A and a second transport path 18B. The first transport path 18A is a path indicated by a one-dot chain line in FIG. 1. The second transport path 18B is a path indicated by a one-dot chain line in FIG. 2.

As illustrated in FIG. 1, the first transport path 18A extends from the supply port 14 toward the first discharge port 15A. The first transport path 18A includes, for example, a common transport path 19. The common transport path 19 is a path common to the first transport path 18A and the second transport path 18B. The common transport path 19 is a straight line or extends in a straight line shape. A direction in which the common transport path 19 extends is a sub-scanning direction D1. The common transport path 19 is a path that passes through a reading area SA. The first transport path 18A includes a curved path 20A. The curved path 20A extends from the common transport path 19. The curved path 20A is curved in a U shape, for example. The first transport path 18A is, for example, a path through which the original document D is transported when the housing 12 is at the first posture.

As illustrated in FIG. 2, the second transport path 18B extends from the supply port 14 toward the second discharge port 15B. The second transport path 18B includes, for example, the common transport path 19. The second transport path 18B includes a straight path 20B. The straight path 20B extends from the common transport path 19. The straight path 20B is a straight path or a path extending in a straight line shape. The second transport path 18B is, for example, a path through which the original document D is transported when the housing 12 is at the second posture. As described above, the image reading apparatus 11 is configured such that the path for transporting the original document D is switched by switching the posture of the housing 12.

As described above, the image reading apparatus 11 is configured such that the angle of the common transport path 19 with respect to the horizontal surface changes by switching the posture of the housing 12. In particular, the image reading apparatus 11 may be configured such that the angle of the common transport path 19 with respect to the horizontal surface when the housing 12 is at the second posture is gentler than that when the housing 12 is at the first posture.

The image reading apparatus 11 includes a transport section 21. The transport section 21 is configured to transport an original document D in the sub-scanning direction D1. In particular, the transport section 21 can transport an original document D of thin paper. The transport section 21 can transport an original document D of thick paper. The transport section 21 can transport a carrier sheet that sandwiches the original document D.

The transport section 21 includes one or more rollers. The transport section 21 includes, for example, a paper feed roller 22, a first roller pair 23, a second roller pair 24, and a third roller pair 25. The paper feed roller 22 is provided at an upstream end of the transport path 18. The paper feed roller 22 supplies the original documents D placed on the paper feed tray 16 one by one to the inside of the housing 12 through the supply port 14.

The first roller pair 23 is provided on the downstream of the paper feed roller 22 on the transport path 18. The first roller pair 23 includes a first driving roller 23A and a first separation roller 23B. In the first separation roller 23B, a friction coefficient of the outer peripheral surface with respect to an original document D is greater than that of the first driving roller 23A. The first separation roller 23B rotates at a rotation speed that is slightly lower than that of the first driving roller 23A. As a result, even when a plurality of original documents D are overlapped and repeatedly fed from the paper feed roller 22, the first roller pair 23 separates one sheet at the bottom and transports the sheet to the downstream of the transport path 18.

The second roller pair 24 is provided on the downstream of the first roller pair 23 on the transport path 18. The second roller pair 24 is provided on the upstream of the reading area SA in the transport path 18. The second roller pair 24 includes a second driving roller 24A and a second driven roller 24B. The second driving roller 24A is rotationally driven to transport the original document D at a predetermined transport speed. The second driven roller 24B is rotated by the rotation of the second driving roller 24A.

The third roller pair 25 is provided on the downstream of the second roller pair 24 on the transport path 18. The third roller pair 25 is provided on the downstream of the reading area SA in the transport path 18. The third roller pair 25 includes a third driving roller 25A and a third driven roller 25B. The third driving roller 25A is rotationally driven to transport the original document D at a predetermined transport speed. The third driven roller 25B is rotated by the rotation of the third driving roller 25A.

The transport section 21 includes a path switching member 26. The path switching member 26 is, for example, a flap. The path switching member 26 switches the path through which the original document D is transported, to the first transport path 18A or the second transport path 18B. The path switching member 26 switches the path through which the original document D is transported, by blocking the first transport path 18A or the second transport path 18B. When the path switching member 26 blocks the first transport path 18A, the path switching member 26 guides the original document D to the second transport path 18B. When the path switching member 26 blocks the second transport path 18B, the path switching member 26 guides the original document D to the first transport path 18A.

The path switching member 26 is linked to, for example, the posture of the housing 12. The path switching member 26 blocks the second transport path 18B when the housing 12 is at the first posture. The path switching member 26 blocks the first transport path 18A when the housing 12 is at the second posture. The path switching member 26 may be displaced regardless of the posture of the housing 12. That is, the path may be switched by the path switching member 26 regardless of the posture of the housing 12.

The image reading apparatus 11 includes one or more sensors that perform detection related to image reading. Specifically, the image reading apparatus 11 may include a first document sensor 31. The first document sensor 31 detects whether or not there is the original document D in the paper feed tray 16. The first document sensor 31 may be, for example, a contact type sensor having a lever, or may be a non-contact type sensor such as an optical sensor.

The image reading apparatus 11 may include a document protection sensor 32. The document protection sensor 32 detects the position of the original document D in the paper feed tray 16. In particular, the document protection sensor 32 detects that the original document D fed to the supply port 14 is inclined and transported, in order to protect the original document D. For example, the document protection sensor 32 may be a non-contact type sensor such as an optical sensor, or may be a contact type sensor having a lever.

The image reading apparatus 11 may include a document thickness sensor 33. The document thickness sensor 33 detects the thickness of the original document D placed on the paper feed tray 16. For example, the document thickness sensor 33 may be capable of detecting any of an original document D of thin paper, an original document D of thick paper, and a carrier sheet, as the types of original document. The document thickness sensor 33 is located, for example, in the housing 12. The document thickness sensor 33 may be, for example, an ultrasonic sensor or an optical sensor.

The image reading apparatus 11 may include a carrier sheet sensor 34. The carrier sheet sensor 34 is provided between the first driving roller 23A and the second driving roller 24A. The carrier sheet sensor 34 detects the carrier sheet sandwiching the original document D. The carrier sheet is a sheet configured to sandwich the original document D by a transparent film. The carrier sheet can be transported along the transport path 18, for example, in a state of sandwiching the original document D such as an original document D having an extremely small size. The carrier sheet sensor 34 may be, for example, an optical sensor. The carrier sheet sensor 34 detects an identification portion such as a mark on the original document D or the carrier sheet.

The image reading apparatus 11 may include a double feed sensor 35. The double feed sensor 35 is provided between the first driving roller 23A and the second driving roller 24A. The double feed sensor 35 is provided on the downstream of the carrier sheet sensor 34 on the transport path 18. The double feed sensor 35 detects double feed of the original document D. The double feed of the original documents D means that a plurality of original documents D are transported in a state of being overlapped with each other.

The image reading apparatus 11 may include a second document sensor 36. The second document sensor 36 is provided on the downstream of the second roller pair 24 in the transport path 18. The second document sensor 36 detects whether or not there is the original document D transported by the second roller pair 24. The second document sensor 36 may be, for example, a contact type sensor having a lever, or may be a non-contact type sensor such as an optical sensor.

The image reading apparatus 11 may include a posture sensor 37. The posture sensor 37 detects the posture of the housing 12. The posture sensor 37 may include a first posture sensor 37A and a second posture sensor 37B, but may be configured by one sensor. The first posture sensor 37A detects that the housing 12 is at the first posture. The first posture sensor 37A may be configured to detect, for example, the path switching member 26 that blocks the second transport path 18B. The second posture sensor 37B detects that the housing 12 is at the second posture. The second posture sensor 37B is configured to detect, for example, the path switching member 26 that blocks the first transport path 18A.

The posture sensor 37 is not limited to the sensor that detects the path switching member 26, and may be, for example, a gyro sensor. When the posture sensor 37 is a gyro sensor, the image reading apparatus 11 may separately include a sensor that detects the position of the path switching member 26.

The image reading apparatus 11 includes one or more reading sections 40. The reading section 40 is configured to read an image from the original document D. The reading section 40 reads an image from the original document D transported along the common transport path 19 in the reading area SA. The reading section 40 is accommodated in the housing 12.

The image reading apparatus 11 includes, for example, two reading sections 40. The two reading sections 40 are located to sandwich the common transport path 19. The two reading sections 40 face each other. The two reading sections 40 read different sides of the original document D. One of the two reading sections 40 reads the front surface of the original document D. The other of the two reading sections 40 reads the back surface of the original document D. As a result, the image reading apparatus 11 reads one side of the original document D or both sides of the original document D.

The reading section 40 includes a light source 41, an image sensor 42, and a background plate 43. The light source 41 is, for example, an LED or a fluorescent lamp. The light source 41 irradiates the facing background plate 43 with light.

The image sensors 42 are arranged in a main scanning direction D2. The image sensors 42 are modularized. The image sensors 42 are, for example, contact type image sensors. Specifically, the image sensors 42 are CMOS image sensors. The image sensor 42 photoelectrically converts the received light. The image sensor 42 outputs an output signal having a value corresponding to the amount of received light.

The image sensors 42 may be monochrome sensors or color sensors. The reading section 40 may be configured to read the original document D in full color. For example, the reading section 40 may be configured to read the original document D in three colors of RGB. The reading section 40 may be configured to read the original document D in a gray scale.

The background plate 43 faces, for example, the light source 41 and the image sensor 42 of another reading section 40. The background plate 43 reflects the light emitted from the light source 41 and causes the reflected light to be incident on the image sensor 42. The background plate 43 is read together with the original document D by the image sensor 42. The background plate 43 is read as a background together with the original document D by the image sensor 42. The background plate 43 is not limited to white, and may be gray, for example.

Electrical Configuration of Image Reading Apparatus 11

Next, an electrical configuration of the image reading apparatus 11 will be described with reference to FIG. 3.

Figure 3:
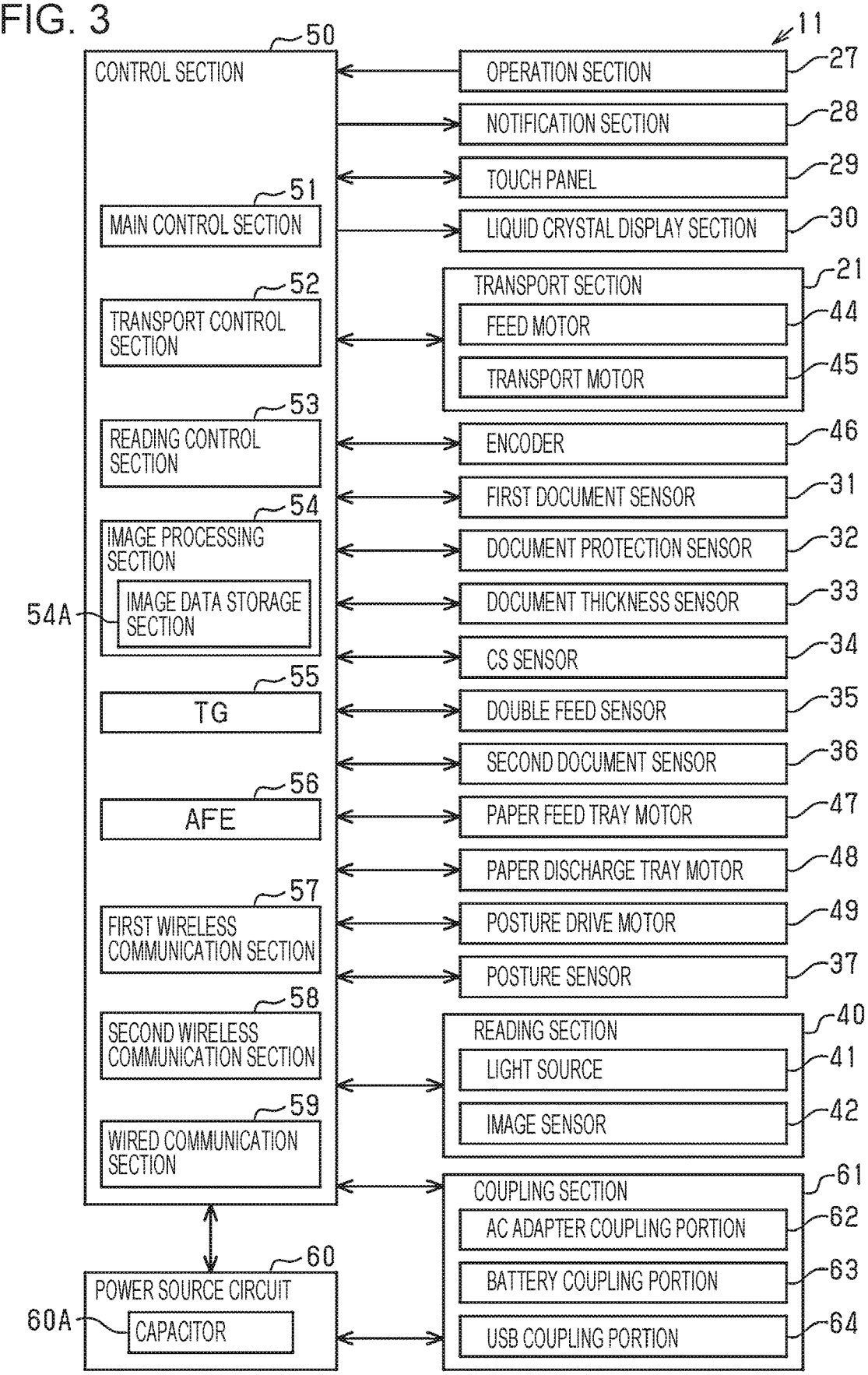
FIG. 3 is a block diagram illustrating an electrical configuration of the image reading apparatus.

As illustrated in FIG. 3, the image reading apparatus 11 includes a control section 50. The control section 50 may collectively control the image reading apparatus 11 and control various operations performed by the image reading apparatus 11. That is, the control section 50 is configured to perform control related to image reading. The control section 50 may include one or more processors that execute various processes in accordance with a program, one or more dedicated hardware circuits such as an integrated circuit for a specific application that executes at least some of the various processes, or combinations of the processors and hardware circuits. The processor includes a CPU and a memory such as a RAM and a ROM, and the memory stores a program code or a command configured to cause the CPU to execute a process. The memory, that is, a computer readable medium includes any readable medium accessible by a general purpose or dedicated computer. The control section 50 may include a system on a chip (SOC).

The image reading apparatus 11 includes an operation section 27. The operation section 27 is provided in the housing 12. The operation section 27 includes a plurality of switches that can be operated by a user. The plurality of switches include a power switch, a start switch, and a stop switch.

The image reading apparatus 11 includes a notification section 28. The notification section 28 is provided in the housing 12. The notification section 28 may be a display section such as an LED. The notification section 28 is configured to perform notification related to image reading. The notification section 28 displays information related to image reading, such as power on/off and a type of mode. As described above, the notification section 28 performs a notification of the controlled mode.

The image reading apparatus 11 includes a touch panel 29 and a liquid crystal display section 30. The touch panel 29 is provided in the housing 12. The touch panel 29 includes a touch area that can be operated by the user. The liquid crystal display section 30 may be a display section configured by, for example, a liquid crystal panel. The liquid crystal display section 30 is configured to display an image at a position corresponding to the touch area of the touch panel 29. The liquid crystal display section 30 displays information related to image reading, such as setting information. The liquid crystal display section 30 can display more detailed information than information from the notification section 28.

The transport section 21 includes a feed motor 44 and a transport motor 45. The feed motor 44 is a source of power for rotationally driving the paper feed roller 22 and the first driving roller 23A. The transport motor 45 is a source of power for rotationally driving the first separation roller 23B, the second driving roller 24A, and the third driving roller 25A.

The image reading apparatus 11 may include an encoder 46. The encoder 46 is provided in the housing 12. The encoder 46 may be, for example, a rotary encoder. The encoder 46 may be capable of detecting the rotation of the second driving roller 24A, and may be capable of detecting the rotation of another roller. The encoder 46 outputs a detection signal including a number of pulses proportional to the rotation amount of the second driving roller 24A.

The image reading apparatus 11 includes a paper feed tray motor 47. The paper feed tray motor 47 is a drive source that can move the paper feed tray 16. The paper feed tray motor 47 corresponds to an example of a first tray drive source.

The image reading apparatus 11 includes a paper discharge tray motor 48. The paper discharge tray motor 48 is a drive source that can move the paper discharge tray 17. The paper discharge tray motor 48 corresponds to an example of a second tray drive source.

The image reading apparatus 11 includes a posture drive motor 49. The posture drive motor 49 is a source of power driven to change the posture of the housing 12. The posture drive motor 49 corresponds to an example of a housing drive source.

The control section 50 is coupled to the operation section 27, the notification section 28, the touch panel 29, and the liquid crystal display section 30. The control section 50 can input an operation signal from the operation section 27. The control section 50 can output a notification signal to the notification section 28. The control section 50 can input a tactile signal from the touch panel 29. The control section 50 can control whether the touch panel 29 is enabled or disabled. The control section 50 can output a signal for displaying an image to the liquid crystal display section 30. The control section 50 can control whether the liquid crystal display section 30 is enabled or disabled.

The control section 50 is coupled to the first document sensor 31, the document protection sensor 32, the document thickness sensor 33, the carrier sheet sensor 34, the double feed sensor 35, the second document sensor 36, the posture sensor 37, and the encoder 46. In FIG. 3, the carrier sheet sensor 34 is referred to as a CS sensor. The control section 50 can receive inputs of detection signals from the first document sensor 31, the document protection sensor 32, the document thickness sensor 33, the carrier sheet sensor 34, the double feed sensor 35, the second document sensor 36, the posture sensor 37, and the encoder 46. The control section 50 can control whether the first document sensor 31, the document protection sensor 32, the document thickness sensor 33, the carrier sheet sensor 34, the double feed sensor 35, the second document sensor 36, the posture sensor 37, and the encoder 46 are enabled or disabled.

The control section 50 is coupled to the feed motor 44, the transport motor 45, the paper feed tray motor 47, the paper discharge tray motor 48, and the posture drive motor 49. The control section 50 can output signals for driving the feed motor 44, the transport motor 45, the paper feed tray motor 47, the paper discharge tray motor 48, and the posture drive motor 49. The feed motor 44 may be configured by, for example, one motor, or may be configured by, for example, a plurality of motors. The transport motor 45 may be configured by, for example, one motor, or may be configured by, for example, a plurality of motors. The paper feed tray motor 47 may be configured by, for example, one motor, or may be configured by, for example, a plurality of motors. The paper discharge tray motor 48 may be configured by, for example, one motor, or may be configured by, for example, a plurality of motors. The posture drive motor 49 may be configured by, for example, one motor, or may be configured by, for example, a plurality of motors.

The paper feed tray motor 47 and the paper discharge tray motor 48 may have the same drive source. The paper feed tray motor 47 and the posture drive motor 49 may have the same drive source. The paper discharge tray motor 48 and the posture drive motor 49 may have the same drive source. The paper feed tray motor 47, the paper discharge tray motor 48, and the posture drive motor 49 may have the same drive source.

The control section 50 includes a timing generator 55. In FIG. 3, the timing generator 55 is indicated by a TG. The timing generator 55 outputs a pulse signal indicating a reading operation timing to the reading section 40.

The control section 50 includes an analog front end 56. In FIG. 3, the analog front end 56 is indicated by an AFE. The analog front end 56 converts an image signal from the image sensor 42 from an analog signal to a digital signal.

The control section 50 is coupled to the reading section 40. The control section 50 can instruct the reading section 40 to read an image via the timing generator 55. The control section 50 can receive an input of an image signal from the reading section 40 via the analog front end 56. The control section 50 can adjust a reading control clock supplied to the timing generator 55 and the analog front end 56. The timing generator 55 and the analog front end 56 are driven at a cycle based on the reading control clock supplied from the control section 50.

The control section 50 includes various functional sections that function by executing a program. In detail, the control section 50 includes a main control section 51, a transport control section 52, a reading control section 53, an image processing section 54, a first wireless communication section 57, a second wireless communication section 58, and a wired communication section 59. The main control section 51 collectively controls the image reading apparatus 11.

The transport control section 52 performs control to transport the original document D along the transport path 18. The transport control section 52 drives and controls the feed motor 44 and the transport motor 45 in accordance with instructions of the main control section 51. In particular, the transport control section 52 drives and controls the feed motor 44 and the transport motor 45 to transport the original document D at a transport speed corresponding to the reading speed. In the present embodiment, paper per minute (ppm), which is the number of sheets at which an original document D having a reference size can be read in one minute, is used as a unit of the reading speed. The reading speed may be designated based on a reading instruction, and may be set in advance in the control section 50, not for each reading instruction.

As a specific example, when the reading speed is 40 ppm, the transport control section 52 transports the original document D at a higher speed than when the reading speed is 30 ppm. When the reading speed is 30 ppm, the transport control section 52 transports the original document D at a higher speed than when the reading speed is 5 ppm.

The reading control section 53 controls the reading section 40 via the timing generator 55. In particular, the reading control section 53 controls light emission of the light source 41. The reading control section 53 controls the image sensor 42 to perform a reading operation. As a result, the reading control section 53 controls the reading section 40 to read the image of the original document D.

The reading control section 53 causes the reading section 40 to read an image at any of 40 ppm, 30 ppm, and 5 ppm as a reading speed. That is, the reading section 40 can read an image at any of a plurality of types of reading speeds including 40 ppm, 30 ppm, and 5 ppm. 5 ppm as the reading speed corresponds to an example of a first reading speed. 40 ppm as the reading speed corresponds to an example of a second reading speed. 30 ppm as the reading speed corresponds to an example of a third reading speed.

The image processing section 54 processes image data of an image read by the reading section 40. In particular, the image processing section 54 can perform predetermined correction on the image data of the image read by the reading section 40. The image processing section 54 includes an image data storage section 54A. The image data storage section 54A can store image data of images read from an original document D of at least a predetermined number of sheets. The predetermined number of sheets may be, for example, one or a plurality of sheets.

The image processing section 54 can output the corrected image data to an external device. Examples of the external device include a universal serial bus (USB) memory, a personal computer, a portable terminal device, and a server device. Regarding communication with an external device, both wired communication and wireless communication can be used. Wired communication includes USB communication via a USB cable, and may include communication via another communication cable such as a local area network (LAN) cable.

The first wireless communication section 57 performs control for performing the first wireless communication. The first wireless communication may be, for example, wireless communication capable of connection between USB devices using the IEEE802.11 standard. In other words, the first wireless communication may be, for example, Wi-Fi (registered trademark).

The second wireless communication section 58 performs control for performing the second wireless communication. The second wireless communication may be, for example, Bluetooth (registered trademark). The second wireless communication is wireless communication in which the communication speed is lower than the communication speed of the first wireless communication, but the power consumption is lower than the power consumption of the first wireless communication.

The wired communication section 59 performs control for performing wired communication. The wired communication may be, for example, communication via a USB cable, or may include communication via another communication cable such as a LAN cable. The wired communication is a communication having power consumption smaller than the first wireless communication and the second wireless communication.

Upon receiving an input of a reading instruction, the image reading apparatus 11 can perform a reading operation of transporting an original document D of one or more sheets placed on the paper feed tray 16 one by one, and reading an image from the original document D. That is, the image reading apparatus 11 can perform a reading operation of reading an image from an original document D of one or a plurality of sheets based on one reading instruction. The reading instruction may be an instruction from the operation section 27, an instruction from the touch panel 29, or an instruction from a personal computer or a portable terminal device.

The image reading apparatus 11 includes a power source circuit 60 and a coupling section 61. The power source circuit 60 supplies the supply power to various members of the image reading apparatus 11 based on the power supplied through the coupling section 61. The coupling section 61 can be coupled to a power supply source from the outside of the image reading apparatus 11. The control section 50 is coupled to the power source circuit 60 and the coupling section 61. The power source circuit 60 is coupled to the coupling section 61.

The power source circuit 60 includes a capacitor 60A. The capacitor 60A is a power storage device capable of storing the supply power supplied to various members. In particular, the capacitor 60A has a capacitance capable of supplementing the power consumption by the execution of a polling process in the first wireless communication. That is, the capacitor 60A may include a capacitor having a capacitance capable of supplementing the power consumption by the execution of the polling process in the first wireless communication. The capacitor 60A has a capacitance capable of supplementing the power consumption by the execution of the polling process in the second wireless communication. That is, the capacitor 60A may include a capacitor having a capacitance capable of supplementing the power consumption by the execution of the polling process in the second wireless communication.

As a specific example, in the polling process of the first wireless communication, when 0.25 A is consumed for 200 µs, the power consumption is 50 µJ. In this case, the capacitor 60A needs a capacitance of about 10 µF in order to supplement the power consumption of 50 µJ.

The coupling section 61 includes an AC adapter coupling portion 62, a battery coupling portion 63, and a USB coupling portion 64. The AC adapter coupling portion 62 can be coupled to an AC adapter cable. That is, the AC adapter coupling portion 62 can be coupled to an AC adapter as a power supply source via the AC adapter cable. The AC adapter coupling portion 62 can be coupled to a commercial power source as the power supply source via the AC adapter cable and the AC adapter.

The battery coupling portion 63 can be coupled to a battery cable. That is, the battery coupling portion 63 can be coupled to the battery as the power supply source via the battery cable. The battery can feed power as the power supply source, and can be charged. The battery coupling portion 63 may be dedicated to the battery, or the USB cable may be inserted and removed into and from the battery coupling portion 63.

The USB coupling portion 64 can be coupled to a USB cable. That is, the USB coupling portion 64 can be coupled to a USB device as the power supply source via the USB cable. The USB device includes, for example, a USB memory, a personal computer, and a portable terminal device.

The control section 50 performs enumeration between the USB coupling portion 64 and a USB device coupled via a USB cable. In particular, the control section 50 performs enumeration with the USB device when the power is turned on. The control section 50 performs enumeration with the USB device by using, as a trigger, a change in the coupling state with the USB device. The control section 50 determines the coupling state with the USB device based on the result of the enumeration, and performs control in accordance with any one of the USB standards.

The USB standards include USB2.0, USB3.0, USB-BC (Battery Charging), USB-PD (Power Delivery), and the like. For the USB standards, the power that can be supplied and the communication speed are different. For example, in USB2.0, power of 2.5 W can be fed. In USB3.0, power of 4.5 W can be fed. In USB-BC, power of 7.5 W can be fed. In USB-PD, power of 15 W or more can be fed. In particular, in the USB-PD, power of 15 W can be fed, but is not limited to this, and power of, for example, 27 W, 45 W, 60 W, or 100 W may be capable of being fed. The AC adapter may be capable of feeding power of 15 W, and the battery may be capable of feeding power of 7.5 W.

As a standard of the USB connector, there are, for example, Type-A, Type-B, Type-C, miniUSB, MicroUSB, and the like. The USB coupling portion 64 is not limited. When USB-PD is adopted, Type-C is preferable.

In the present embodiment, as a result of the enumeration with the USB device, the case that coupling is performed in USB3.0 as the USB standard means that coupling to a low power-feeding USB device is performed. The case that coupling is performed in USB-BC as the USB standard means that coupling to a medium power-feeding USB device is performed. The case that coupling is performed in USB-PD as the USB standard means that coupling to a high power-feeding USB device is performed. A power range of 4.5 W or more and less than 7.5 W may be referred to as a low power range. A power range of 7.5 W or more and less than 15 W may be referred to as a medium power range. A power range of 15 W or more may be referred to as a high power range.

As described above, the low power-feeding USB device can feed power of a power value included within the low power range. A medium power-feeding USB device can feed power of a power value included within the medium power range. A high power-feeding USB device can feed power of a power value included within the high power range. The AC adapter can feed power of a power value included within the high power range. The battery can feed power of a power value included within the medium power range.

The low power-feeding USB device corresponds to an example of a third device. A high power-feeding USB device and an AC adapter correspond to an example of a second device. A medium power-feeding USB device and a battery correspond to an example of a first device. The low power range corresponds to an example of a third power range. The high power range corresponds to an example of a second power range. The medium power range corresponds to an example of a first power range.

The control section 50 monitors the coupling state of the coupling section 61 to the power source circuit 60. In detail, the control section 50 monitors whether or not the AC adapter is coupled to the power source circuit 60. The control section 50 monitors whether or not the battery is coupled to the power source circuit 60. The control section 50 monitors whether or not the USB device is coupled to the power source circuit 60. The control section 50 can also monitor the charging amount of the battery coupled to the power source circuit 60.

The control section 50 determines which of the power supply sources coupled to the coupling section 61 is selected based on the coupling state of the coupling section 61 to the power source circuit 60. The control section 50 instructs the power source circuit 60 of the determined power supply source. The power source circuit 60 supplies the supply power to various members of the image reading apparatus 11 based on the power from the power supply source instructed by the control section 50.

In particular, the control section 50 determines the power supply source in accordance with a predetermined priority for the coupling state. In detail, the control section 50 determines the power supply source with the priorities of the AC adapter, the high power-feeding USB device, the battery, the medium power-feeding USB device, and the low power-feeding USB device.

As a specific example, when the AC adapter is coupled to the power source circuit 60, the control section 50 determines the AC adapter as the power supply source. In detail, the control section 50 uses the AC adapter as the power supply source in a coupling state in which the AC adapter and the high power-feeding USB device are coupled. The control section 50 uses the AC adapter as the power supply source in a coupling state in which the AC adapter and the medium power-feeding USB device are coupled. The control section 50 uses the AC adapter as the power supply source in a coupling state in which the AC adapter and the low power-feeding USB device are coupled. The control section 50 uses the AC adapter as the power supply source in a coupling state in which the AC adapter and the battery are coupled.

The control section 50 uses the high power-feeding USB device as the power supply source in a coupling state in which the AC adapter is not coupled to the power source circuit 60 and the high power-feeding USB device is coupled to the power source circuit 60. The control section 50 uses the medium power-feeding USB device as the power supply source in a coupling state in which the AC adapter is not coupled to the power source circuit 60 and the medium power-feeding USB device is coupled to the power source circuit 60. The control section 50 uses the low power-feeding USB device as the power supply source in a coupling state in which the AC adapter is not coupled to the power source circuit 60 and the low power-feeding USB device is coupled to the power source circuit 60.

When the AC adapter is not coupled to the power source circuit 60 and the high power-feeding USB device and the battery are coupled to the power source circuit 60, the control section 50 determines the high power-feeding USB device as the power supply source. When the AC adapter is not coupled to the power source circuit 60 and the medium power-feeding USB device and the battery are coupled to the power source circuit 60, the control section 50 determines the battery as the power supply source. When the AC adapter is not coupled to the power source circuit 60 and the low power-feeding USB device and the battery are coupled to the power source circuit 60, the control section 50 determines the battery as the power supply source.

When the power range of the power supply source changes to increase during image reading based on a reading instruction, the control section 50 may not issue an instruction to change the power supply source. When the power range of the power supply source changes to decrease during image reading based on the reading instruction, the control section 50 can issue an instruction to change the power supply source. When the power range of the power supply source does not change during image reading based on the reading instruction, the control section 50 can issue an instruction to change the power supply source. When image reading based on the reading instruction is not performed, the control section 50 can issue an instruction to change the power supply source based on the coupling state with the AC adapter, the battery, and the USB device.

A period during image reading based on a reading instruction indicates, when an image is read from an original document D having a plurality of sheets based on one reading instruction, a period from the start of image reading from the first sheet of the original document D having the plurality of sheets to the end of image reading from the original document D having the plurality of sheets. Therefore, the period during the image reading based on the reading instruction includes a reading period in which an image is actually read by the reading section 40 and a non-reading period in which actually an image is not read by the reading section 40, in a control period based on the reading instruction.

As a specific example, when the coupling state is changed from the coupling state in which the AC adapter and the high power-feeding USB device are coupled, to the coupling state in which the AC adapter is not coupled, the power range of the power supply source does not change. When the coupling state is changed from the coupling state in which the battery and the medium power-feeding USB device are coupled, to the coupling state in which the battery is not coupled, the power range of the power supply source does not change.

When the coupling state is changed from the coupling state in which the AC adapter and the medium power-feeding USB device are coupled, to the coupling state in which the AC adapter is not coupled, the power range of the power supply source changes to decrease. When the coupling state is changed from the coupling state in which the AC adapter and the battery are coupled, to the coupling state in which the AC adapter is not coupled, the power range of the power supply source changes to decrease. When the coupling state is changed from the coupling state in which the AC adapter and the low power-feeding USB device are coupled, to the coupling state in which the AC adapter is not coupled, the power range of the power supply source changes to decrease.

When the coupling state is changed from the coupling state in which the medium power-feeding USB device is coupled, to the coupling state in which the AC adapter is coupled, the power range of the power supply source changes to increase. When the coupling state is changed from the coupling state in which the low power-feeding USB device is coupled, to the coupling state in which the AC adapter is coupled, the power range of the power supply source changes to increase.

The control section 50 can perform control in any one of a plurality of types of modes based on the designated power supply source. In other words, the control section 50 can perform control in any one of a plurality of types of modes based on the coupling state with the AC adapter, the battery, and the USB device.

The plurality of types of modes are modes in which the power consumption of the image reading apparatus 11 is different. The plurality of types of modes include a low output mode, a medium output mode, and a high output mode. The medium output mode is a mode in which power consumption is smaller than the high output mode. The low output mode is a mode in which power consumption is smaller than the medium output mode.

The high output mode is a mode that can be controlled when either the AC adapter or the high power-feeding USB device is the power supply source. The medium output mode is a mode that can be controlled when either the battery or the medium power-feeding USB device is the power supply source. The low output mode is a mode that can be controlled when the low power-feeding USB device is the power supply source.

In other words, the high output mode is a mode that can be controlled in the coupling state where the high power-feeding USB device is coupled to the power source circuit 60. The high output mode is a mode that can be controlled in the coupling state in which the AC adapter is coupled to the power source circuit 60. The medium output mode is a mode that can be controlled in the coupling state in which the medium power-feeding USB device is coupled to the power source circuit 60. The medium output mode is a mode that can be controlled in the coupling state in which the battery is coupled to the power source circuit 60. The low output mode is a mode that can be controlled in the coupling state in which the low power-feeding USB device is coupled to the power source circuit 60. The low output mode corresponds to an example of a third mode. The high output mode corresponds to an example of a second mode. The medium output mode corresponds to an example of a first mode.

Specifically, the control section 50 performs control in the high output mode in the coupling state in which the AC adapter and the high power-feeding USB device are coupled to the power source circuit 60. The control section 50 performs control in the high output mode in the coupling state in which the AC adapter and the medium power-feeding USB device are coupled to the power source circuit 60. The control section 50 performs control in the high output mode in the coupling state in which the AC adapter and the low power-feeding USB device are coupled to the power source circuit 60.

The control section 50 performs control in the high output mode in the coupling state in which the AC adapter is not coupled to the power source circuit 60 and the high power-feeding USB device is coupled to the power source circuit 60. The control section 50 performs control in the medium output mode in the coupling state in which the AC adapter is not coupled to the power source circuit 60 and the medium power-feeding USB device is coupled to the power source circuit 60. The control section 50 performs control in the low output mode in the coupling state in which the AC adapter is not coupled to the power source circuit 60 and the low power-feeding USB device is coupled to the power source circuit 60.

The control section 50 performs control in the high output mode in the coupling state in which the AC adapter is not coupled to the power source circuit 60, and the high power-feeding USB device and the battery are coupled to the power source circuit 60. The control section 50 performs control in the medium output mode in the coupling state in which the AC adapter is not coupled to the power source circuit 60, and the medium power-feeding USB device and the battery are coupled to the power source circuit 60. The control section 50 performs control in the medium output mode in the coupling state in which the AC adapter is not coupled to the power source circuit 60, and the low power-feeding USB device and the battery are coupled to the power source circuit 60.

Mode Control Contents

Here, the control contents for each mode will be described with reference to FIGS. 4 to 6.

As illustrated in FIG. 4, the control contents correspond to each of the plurality of types of modes. The control is performed with the control contents corresponding to the mode set among the plurality of types of modes. In FIG. 4, enabling information is indicated by "Y" and disabling information is indicated by "N".

In detail, the control contents corresponding to each of the plurality of types of modes include the control content, the reading speed, and the reading control clock of the control section 50. The control contents corresponding to each of the plurality of types of modes include a document type, a carrier sheet, double feed detection, document protection, posture drive, and tray drive. The control contents corresponding to each of the plurality of types of modes include a communication method, a liquid crystal display, a touch panel, a USB memory, and a sensor time division control.

As the control content of the control section 50, in the medium output mode, the power consumption is lower than the power consumption in the high output mode. As the control content of the control section 50, in the low output mode, the power consumption is lower than the power consumption in the medium output mode.

In particular, the control contents of the control section 50 include the adjustment of the operating frequency of the control section 50. As a specific example, the operating frequency of the control section 50 in the medium output mode is set to be lower than the operating frequency in the high output mode. The operating frequency of the control section 50 in the low output mode is set to be lower than the operating frequency in the medium output mode.

The control contents of the control section 50 include whether to enable or disable the function of the control section 50. In the medium output mode, the function of the control section 50 is set to be disabled as compared with the high output mode. In the low output mode, the function of the control section 50 is set to be disabled as compared with the medium output mode.

In detail, when the control section 50 includes a plurality of CPUs, the function of the control section 50 includes the function of at least one of the plurality of CPUs. The function of the control section 50 includes a GPU function related to image processing. The function of the control section 50 includes a function of controlling a storage medium such as a flash memory. The function of the control section 50 includes a function for image processing of an image read by the reading section 40. The function of the control section 50 includes a function for communication using infrared rays or the like.

As for the reading speed, in the high output mode, an image can be read at 40 ppm, 30 ppm, and 5 ppm. As for the reading speed, in the medium output mode, it is not possible to read an image at 40 ppm, and an image can be read at 30 ppm and 5 ppm. As for the reading speed, in the low output mode, it is not possible to read an image at 40 ppm and 30 ppm, and an image can be read at 5 ppm. When the reading speed is low, the power consumption is low.

As described above, the control section 50 can cause the reading section 40 to read an image at 40 ppm in the high output mode. The control section 50 can cause the reading section 40 to read an image at 30 ppm in the high output mode. The control section 50 can cause the reading section 40 to read an image at 5 ppm in the high output mode.

The control section 50 does not cause the reading section 40 to read the image at 40 ppm in the medium output mode. The control section 50 can cause the reading section 40 to read an image at 30 ppm in the medium output mode. The control section 50 can cause the reading section 40 to read an image at 5 ppm in the medium output mode.

The control section 50 does not cause the reading section 40 to read an image at 40 ppm in the low output mode. The control section 50 does not cause the reading section 40 to read an image at 30 ppm in the low output mode. The control section 50 can cause the reading section 40 to read an image at 5 ppm in the low output mode.

The reading control clock has a lower cycle in the medium output mode and the low output mode than the high output mode. The reading control clock is a clock for designating a control cycle of the reading section 40. In detail, the reading control clock is a clock for designating a control cycle for the timing generator 55 and the analog front end 56. When the reading control clock is low, the power consumption is low.

In the high output mode, the control section 50 outputs a reading control clock having a normal cycle to the timing generator 55 and the analog front end 56. The control section 50 outputs a reading control clock having a cycle lower than the normal cycle, to the timing generator 55 and the analog front end 56 in the medium output mode and the low output mode.

The document type includes an original document D of thin paper and an original document D of thick paper. The original document D of thick paper requires more transporting force by the transport section 21 than the transporting force for the original document D of thin paper. Therefore, the original document D of thick paper has a larger control load by the transport section 21 and larger power consumption than the original document D of thin paper.

As for the document type, an image can be read from both the original document D of thin paper and the original document D of thick paper in the high output mode. In the medium output mode and the low output mode, an image can be read from the original document D of thin paper, but the image is not read from the original document D of thick paper.

In the high output mode, the control section 50 causes the transport section 21 to transport the original document D, and causes the reading section 40 to read an image from the original document D, regardless of the type of the original document D. In the medium output mode and the low output mode, when the control section 50 specifies the transport of the original document D of thin paper based on a detection signal from the document thickness sensor 33, the control section 50 causes the transport section 21 to transport the original document D of thin paper and causes the reading section 40 to read an image from the original document D of thin paper. In the medium output mode and the low output mode, when the control section 50 specifies the transport of the original document D of thick paper based on the detection signal from the document thickness sensor 33, the control section 50 stops transport of the original document D of thick paper and image reading from the original document D of thick paper.

As for the carrier sheet, the transport of the carrier sheet and the carrier sheet sensor 34 are enabled in the high output mode and the medium output mode, and the transport of the carrier sheet and the carrier sheet sensor 34 are disabled in the low output mode. The carrier sheet requires more transporting force by the transport section 21 than the transporting force for the original document D of thin paper. Therefore, the carrier sheet has a larger control load by the transport section 21 and larger power consumption than the original document D of thin paper. By disabling the carrier sheet sensor 34, the power consumption is reduced.

When the control section 50 specifies the transport of the carrier sheet based on the detection signal from the document thickness sensor 33 in the high output mode and the medium output mode, the control section 50 causes the transport section 21 to transport the carrier sheet, and causes the reading section 40 to read an image from the carrier sheet. The control section 50 performs control by enabling the carrier sheet sensor 34 in the high output mode and the medium output mode. In the low output mode, when the control section 50 specifies the transport of the carrier sheet based on the detection signal from the document thickness sensor 33, the control section 50 stops the transport of the carrier sheet. The control section 50 controls the carrier sheet sensor 34 to be disabled in the low output mode. That is, the control section 50 does not cause the transport section 21 to transport the carrier sheet in the low output mode, but can cause the transport section 21 to transport the carrier sheet in the high output mode and the medium output mode.

As for the double feed detection, the double feed sensor 35 is enabled in the high output mode, and the double feed sensor 35 is disabled in the medium output mode and the low output mode.

The control section 50 controls the double feed sensor 35 to be enabled in the high output mode. The control section 50 controls the double feed sensor 35 to be disabled in the medium output mode and the low output mode.

As for the document protection, the document protection sensor 32 is enabled in the high output mode and the medium output mode, and the document protection sensor 32 is disabled in the low output mode. By disabling the document protection sensor 32, the power consumption is reduced.

The control section 50 controls the document protection sensor 32 to be enabled in the high output mode and the medium output mode. The control section 50 controls the document protection sensor 32 to be disabled in the low output mode.

The posture drive is a drive of the posture drive motor 49 for changing the posture of the housing 12. As for the posture drive, the drive of the posture drive motor 49 is enabled in the high output mode and the medium output mode, and the drive of the posture drive motor 49 is disabled in the low output mode. By disabling the driving of the posture drive motor 49, the power consumption is reduced.

The control section 50 does not drive the posture drive motor 49 in the low output mode. The control section 50 can drive the posture drive motor 49 in the high output mode and the medium output mode.

The tray drive includes a drive of the paper feed tray motor 47 and a drive of the paper discharge tray motor 48. As for the tray drive, the tray drive is enabled in the high output mode, and the tray drive is disabled in the medium output mode and the low output mode. By disabling the tray drive, the power consumption is reduced.

The control section 50 does not drive the paper feed tray motor 47 in the medium output mode and the low output mode. The control section 50 can drive the paper feed tray motor 47 in the high output mode.

The control section 50 does not drive the paper discharge tray motor 48 in the medium output mode and the low output mode. The control section 50 can drive the paper discharge tray motor 48 in the high output mode.

The communication method includes a first wireless communication, a second wireless communication, and a wired communication. As for the wired communication, the output of image data via the wired communication is enabled in the high output mode, the medium output mode, and the low output mode.

As for the first wireless communication, the output of the image data via the first wireless communication is enabled in the high output mode. As for the first wireless communication, the output of the image data via the first wireless communication is disabled in the low output mode. As for the first wireless communication, in the medium output mode, the output of the image data via the first wireless communication is disabled during image reading based on a reading instruction. When image reading based on the reading instruction is not being performed, the output of the image data via the first wireless communication is enabled. By disabling the first wireless communication, the power consumption is reduced. In particular, during image reading based on the reading instruction, the first wireless communication is disabled, so that the power consumption is reduced.

As for the second wireless communication, the output of image data via the second wireless communication is enabled in the high output mode and the medium output mode. As for the second wireless communication, in the low output mode, the output of the image data via the second wireless communication is disabled during image reading based on a reading instruction. When image reading based on the reading instruction is not being performed, the output of the image data via the second wireless communication is enabled. By disabling the second wireless communication, the power consumption is reduced. In particular, during image reading based on the reading instruction, the second wireless communication is disabled, so that the power consumption is reduced.

In the high output mode, the medium output mode, and the low output mode, when the control section 50 is in a coupling state where the wired communication is possible, the control section 50 controls the output of the image data via the wired communication to be enabled. As a result, the control section 50 can output the image data via the wired communication in the high output mode, the medium output mode, and the low output mode.

In the high output mode, when the control section 50 is in a coupling state where the first wireless communication is possible, the control section 50 controls the output of the image data via the first wireless communication to be enabled. As a result, the control section 50 can output the image data via the first wireless communication in the high output mode.

In the present embodiment, the control section 50 executes the polling process of the first wireless communication at predetermined intervals. The control section 50 can specify whether or not the control section 50 is in a coupling state where the first wireless communication with the external device is possible, by executing the polling process of the first wireless communication. That is, the control section 50 can execute the polling process for recognizing the coupling state in which the first wireless communication is enabled.

In the high output mode and the medium output mode, when the control section 50 is in a coupling state where the second wireless communication is possible, the control section 50 controls the output of the image data via the second wireless communication to be enabled. As a result, the control section 50 can output the image data via the second wireless communication in the high output mode and the medium output mode.

In the present embodiment, the control section 50 executes the polling process of the second wireless communication at predetermined intervals. The control section 50 can specify whether or not the control section 50 is in a coupling state where the second wireless communication with the external device is possible, by executing the polling process of the second wireless communication. That is, the control section 50 can execute the polling process for recognizing the coupling state in which the second wireless communication is enabled.

In the medium output mode, when the control section 50 is in the coupling state where the first wireless communication is possible, and the image reading based on the reading instruction is not being performed, the control section 50 controls the output of the image data via the first wireless communication to be enabled. As a result, in the medium output mode, when the image reading based on the reading instruction is not being performed, the control section 50 can output the image data via the first wireless communication. In the medium output mode, when the control section 50 is in the coupling state where the first wireless communication is possible, and the image reading is being performed based on the reading instruction, the control section 50 controls the output of the image data via the first wireless communication to be disabled. As a result, in the medium output mode, when the image reading is being performed based on the reading instruction, the control section 50 does not output the image data via the first wireless communication.

In the low output mode, when the control section 50 is in the coupling state where the second wireless communication is possible, and the image reading based on the reading instruction is not being performed, the control section 50 controls the output of the image data via the second wireless communication to be enabled. As a result, in the low output mode, when the image reading based on the reading instruction is not being performed, the control section 50 can output the image data via the second wireless communication. In the low output mode, when the control section 50 is in the coupling state where the second wireless communication is possible, and the image reading is being performed based on the reading instruction, the control section 50 controls the output of the image data via the second wireless communication to be disabled. As a result, in the low medium output mode, when the image reading is being performed based on the reading instruction, the control section 50 does not output the image data via the second wireless communication.

In the low output mode, when the control section 50 is in a coupling state where the first wireless communication is possible, the control section 50 controls the output of the image data via the first wireless communication to be disabled. As a result, the control section 50 does not output the image data via the first wireless communication in the low output mode.

When a plurality of types of communication methods are enabled, the control section 50 determines the communication method in accordance with a predetermined priority for the communication methods. In detail, the control section 50 determines the communication method with the priorities of the wired communication, the second wireless communication, and the first wireless communication.

In detail, the control section 50 determines the second wireless communication as the communication method when the control section 50 is in a coupling state where the wired communication is not enabled and the first wireless communication and the second wireless communication are enabled. The control section 50 determines the wired communication as the communication method when the control section 50 is in a coupling state where the second wireless communication is not enabled and the wired communication and the first wireless communication are enabled. The control section 50 determines the wired communication as the communication method when the control section 50 is in a coupling state where the wired communication, the first wireless communication, and the second wireless communication are enabled.

As a specific example, in the high output mode, when the control section 50 is in the coupling state where first wireless communication, the second wireless communication, and the wired communication are enabled, the control section 50 outputs image data via the wired communication with priority over the first wireless communication and the second wireless communication.

In other words, the control section 50 can execute a reading process, a first wireless output process, a second wireless output process, and a wired output process. The reading process is a process of causing the transport section 21 to transport an original document D and causing the reading section 40 to read an image from the original document D. The first wireless output process is a process of outputting image data to an external device via the first wireless communication. The second wireless output process is a process of outputting image data to an external device via the second wireless communication. The wired output process is a process of outputting image data to an external device via the wired communication.

In detail, in the high output mode, the control section 50 can execute the first wireless output process, the second wireless output process, and the wired output process even both before the end of the reading process and after the end of the reading process. In particular, in the high output mode, when the control section 50 is in the coupling state where the first wireless communication, the second wireless communication, and the wired communication are enabled, the control section 50 can execute the wired output process with priority over the first wireless output process and the second wireless output process. In the high output mode, when the control section 50 is in a coupling state where the first wireless communication and the second wireless communication are enabled, the control section 50 can execute the second wireless output process with priority over the first wireless output process.

In the medium output mode, the control section 50 can execute the second wireless output process and the wired output process even both before the end of the reading process and after the end of the reading process. In the medium output mode, the control section 50 does not execute the first wireless output process in a period during the execution of the reading process and before the end of the reading process, and can execute the first wireless output process after the end of the reading process.

In the low output mode, the control section 50 can execute the wired output process without executing the first wireless output process, even both before the end of the reading process and after the end of the reading process. In the low output mode, the control section 50 does not execute the second wireless output process in a period during the execution of the reading process and before the end of the reading process, and can execute the second wireless output process after the end of the reading process.

As for the liquid crystal display, the liquid crystal display section 30 is enabled in the high output mode and the medium output mode, and the liquid crystal display section 30 is disabled in the low output mode. By disabling the liquid crystal display section 30, the power consumption is reduced.

The control section 50 controls the liquid crystal display section 30 to be enabled in the high output mode and the medium output mode. As a result, the control section 50 can cause the liquid crystal display section 30 to display an image in the high output mode and the medium output mode. The control section 50 controls the liquid crystal display section 30 to be disabled in the low output mode. As a result, the control section 50 does not cause the liquid crystal display section 30 to display the image in the low output mode.

As for the touch panel, the touch panel 29 is enabled in the high output mode and the medium output mode, and the touch panel 29 is disabled in the low output mode. By disabling the touch panel 29, the power consumption is reduced.

The control section 50 controls the touch panel 29 to be enabled in the high output mode and the medium output mode. As a result, the control section 50 can receive an input of a signal from the touch panel 29 in the high output mode and the medium output mode. The control section 50 controls the touch panel 29 to be disabled in the low output mode. As a result, the control section 50 does not receive the input of the signal from the touch panel 29 in the low output mode.

As for the USB memory, when the USB memory is coupled via the USB coupling portion 64, it is shown whether storing image data in the USB memory is enabled or disabled. As for the USB memory, storing the image data in the USB memory is enabled in the high output mode, and storing the image data in the USB memory is disabled in the medium output mode and the low output mode. By disabling storing the image data in the USB memory, the power consumption is reduced. In the present embodiment, storing the image data in the USB memory consumes more power than the output of the image data via the wired communication.

The control section 50 controls storing the image data in the USB memory to be enabled in the high output mode. As a result, the control section 50 can store the image data in the USB memory in the high output mode. The control section 50 controls storing the image data in the USB memory to be disabled in the medium output mode and the low output mode. As a result, the control section 50 does not store the image data in the USB memory in the medium output mode and the low output mode.

The time division control of the sensor is disabled in the high output mode and is enabled in the medium output mode and the low output mode. The time division control is control of performing switching between an enabling period in which the sensor is enabled and a disabling period in which the sensor is disabled.

The control section 50 does not perform the time division control on the sensor to be controlled to be enabled in the high output mode. The control section 50 can perform the time division control on the sensor to be controlled to be enabled in the medium output mode and the low output mode.

Sensor Time Division Control

Here, the sensor time division control will be described with reference to FIG. 5. FIG. 5 illustrates a specific example in which the time division control is performed for a first sensor, a second sensor, and a third sensor.

Figure 5:
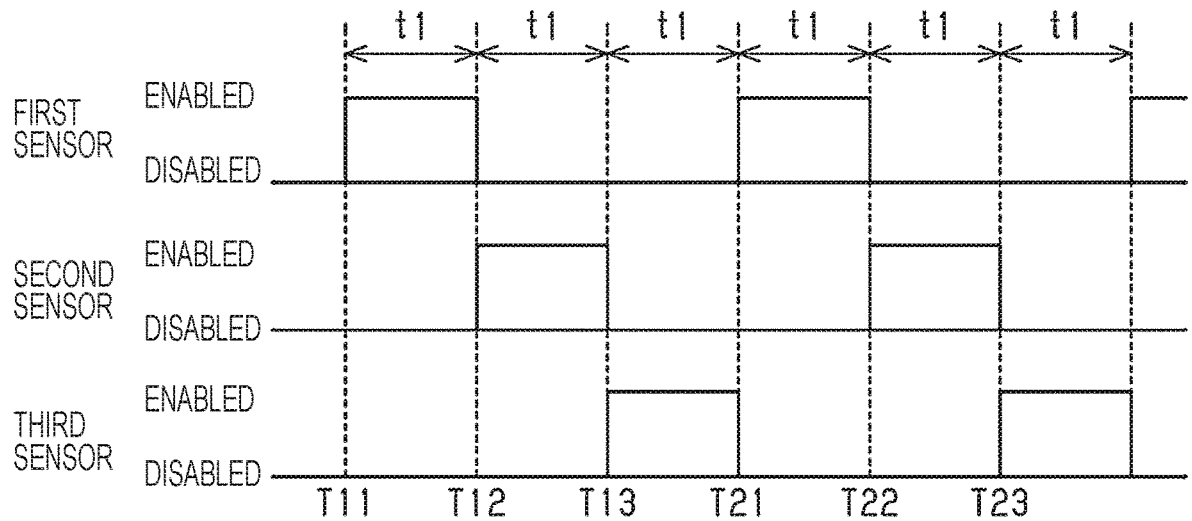
FIG. 5 is a timing chart illustrating a sensor control timing.

As illustrated in FIG. 5, at a timing indicated by the reference sign T11, the first sensor is enabled, and the second sensor and the third sensor are disabled. When a time t1 has elapsed from the timing indicated by the reference sign T11, the second sensor becomes enabled, and the first sensor and the third sensor become disabled at a timing indicated by the reference sign T12. The time t1 is a time obtained by dividing the number of sensors by the control cycle in which the sensors are enabled. When the time t1 has elapsed from the timing indicated by the reference sign T12, the third sensor becomes enabled, and the first sensor and the second sensor become disabled at a timing indicated by the reference sign T13.

When the time t1 has elapsed from the timing indicated by the reference sign T13, the first sensor becomes enabled, and the second sensor and the third sensor become disabled at a timing indicated by the reference sign T21. When the time t1 has elapsed from the timing indicated by the reference sign T21, the second sensor becomes enabled, and the first sensor and the third sensor become disabled at a timing indicated by the reference sign T22. When the time t1 has elapsed from the timing indicated by the reference sign T22, the third sensor becomes enabled, and the first sensor and the second sensor become disabled at a timing indicated by the reference sign T23.

By repeating such control, the enabling period in which the sensor is enabled and the disabling period in which the sensor is disabled are switched to divide the time in the control cycle in which the sensor is enabled. As described above, by performing the time division control of the sensor, the power consumption is reduced. In addition, the timing at which the sensor is enabled is adjusted so that the enabling periods in which the respective sensors are enabled do not overlap. As described above, by performing the time division control of the sensor, the instantaneous power consumption is also reduced.

Reading Process and Output Process

Next, the reading process and the output process will be described with reference to FIG. 6. In particular, the reading process and the first wireless output process in the high output mode and the medium output mode will be mainly described.

Figure 6:
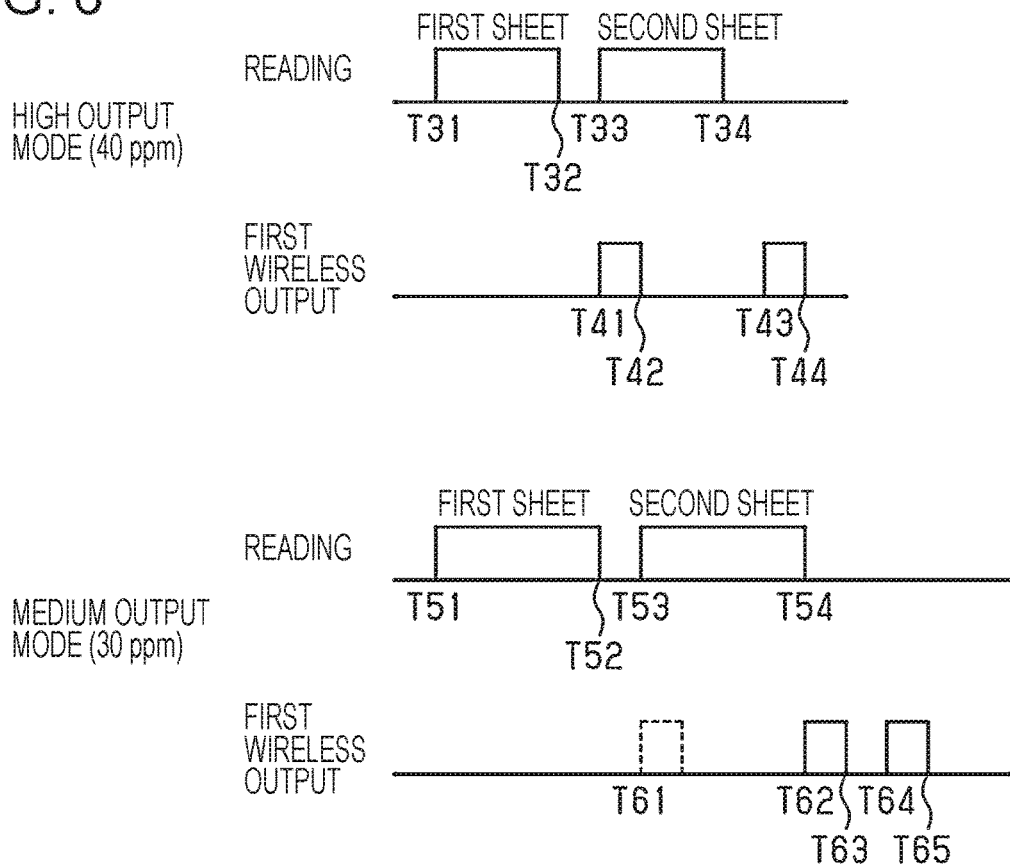
FIG. 6 is a timing chart illustrating a reading timing of an image and an output timing of image data.

As illustrated in FIG. 6, the control section 50 executes a reading process of reading an image from an original document D of two sheets at 40 ppm based on a reading instruction in the high output mode. In such a case, the control section 50 starts the reading process of reading an image from the first sheet of the original document D at a timing indicated by the reference sign T31. The control section 50 ends the reading process of reading the image from the first sheet of the original document D at a timing indicated by the reference sign T32.

The control section 50 starts the reading process of reading the image from the second sheet of the original document D at a timing indicated by the reference sign T33. The control section 50 ends the reading process of reading the image from the second sheet of the original document D at a timing indicated by the reference sign T34.

When the control section 50 is in a state where image data of the first sheet of the original document D can be output at a timing indicated by the reference sign T41, the control section starts the first wireless output process of outputting the image data of the first sheet of the original document D even after the reading process of reading the image from the second sheet of the original document D has been started. The control section 50 ends the first wireless output process of outputting the image data of the first sheet of the original document D at a timing indicated by the reference sign T42.

When the control section 50 is in a state where image data of the second sheet of the original document D can be output at a timing indicated by the reference sign T43, the control section starts the first wireless output process of outputting the image data of the second sheet of the original document D even after the reading process of reading the image from the second sheet of the original document D has been ended. The control section 50 ends the first wireless output process of outputting the image data of the second sheet of the original document D at a timing indicated by the reference sign T44.

As described above, in the high output mode, when the control section 50 causes the image to be read from an original document D of a plurality of sheets based on the input of the reading instruction, the control section 50 can execute the first wireless output process even both before and after the end of the reading process of reading images from the original document D of the plurality of sheets. That is, in the high output mode, the control section 50 can execute the first wireless output process even both before and after the end of the reading process.

Then, the control section 50 executes a reading process of reading an image from an original document D of two sheets at 30 ppm based on a reading instruction in the medium output mode. In such a case, the control section 50 starts the reading process of reading an image from the first sheet of the original document D at a timing indicated by the reference sign T51. The control section 50 ends the reading process of reading the image from the first sheet of the original document D at a timing indicated by the reference sign T52.

The control section 50 starts the reading process of reading the image from the second sheet of the original document D at a timing indicated by the reference sign T53. The control section 50 ends the reading process of reading the image from the second sheet of the original document D at a timing indicated by the reference sign T54.

When the control section 50 is in a state where the image data of the first sheet of the original document D can be output at a timing indicated by the reference sign T61, the control section 50 determines whether or not the current time is before the reading process of reading an image from the second sheet of the original document D is ended. When the control section 50 determines that the current time is before the reading process of reading an image from the second sheet of the original document D is ended, the control section 50 does not start the first wireless output process of outputting the image data of the first sheet of the original document D, and causes the execution of the first wireless output process to wait.

When the control section 50 determines that the current time is after the reading process of reading an image from the second sheet of the original document D is ended, at a timing indicated by the reference sign T62, the control section 50 starts the first wireless output process of outputting the image data of the first sheet of the original document D. The control section 50 ends the first wireless output process of outputting the image data of the first sheet of the original document D at a timing indicated by the reference sign T63.

When a timing indicated by the reference sign T64 is after the control section 50 is in a state where image data of the second sheet of the original document D can be output, and after the reading process of reading the image from the second sheet of the original document D is ended, the control section 50 starts the first wireless output process of outputting the image data of the second sheet of the original document D. The control section 50 ends the first wireless output process of outputting the image data of the second sheet of the original document D at a timing indicated by the reference sign T65.

As described above, in the medium output mode, when the control section 50 causes the image to be read from the original document D of the plurality of sheets based on the input of the reading instruction, the control section 50 does not execute the first wireless output process before the reading process of reading the images from the original document D of the plurality of sheets is ended. In the medium output mode, the control section 50 can execute the first wireless output process after the reading process of reading the images from the original document D of the plurality of sheets is ended. That is, in the medium output mode, the control section 50 does not execute the first wireless output process before the end of the reading process and can execute the first wireless output process after the end of the reading process.

Similarly, in the low output mode, when the control section 50 causes the image to be read from the original document D of the plurality of sheets based on the input of the reading instruction, the control section 50 does not execute the second wireless output process before the reading process of reading the images from the original document D of the plurality of sheets is ended. In the low output mode, the control section 50 can execute the second wireless output process after the reading process of reading the images from the original document D of the plurality of sheets is ended. That is, in the low output mode, the control section 50 does not execute the second wireless output process before the end of the reading process and can execute the second wireless output process after the end of the reading process. In other words, the control section 50 does not execute the first wireless output process in the low output mode, but can execute the second wireless output process.

Startup Mode Setting Process

Here, a startup mode setting process will be described with reference to FIG. 7. The startup mode setting process is a process that is called after an initial setting process is ended when the image reading apparatus 11 is started.

Figure 7:
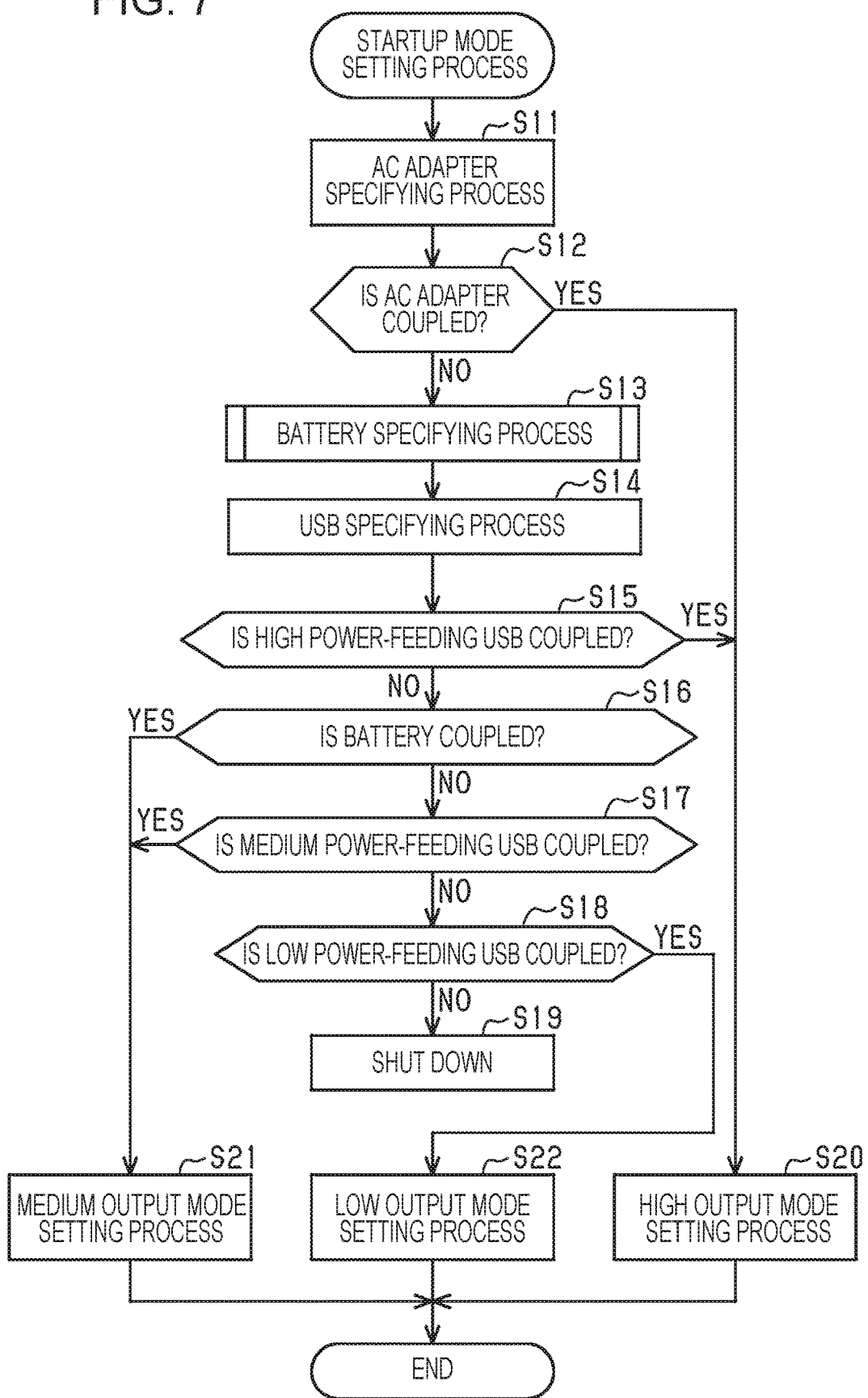
FIG. 7 is a flowchart illustrating a startup mode setting process.

As illustrated in FIG. 7, in Step S11, the control section 50 executes an AC adapter specifying process. In this process, the control section 50 specifies whether or not the AC adapter is coupled to the power source circuit 60. When this process is ended, the control section 50 proceeds to the process to Step S12.

In Step S12, the control section 50 determines whether or not the AC adapter is coupled. When the control section 50 determines that the AC adapter is coupled, the process proceeds to Step S20. When the control section 50 determines that the AC adapter is not coupled, the process proceeds to Step S13.

In Step S13, the control section 50 executes a battery specifying process. In this process, as will be described in detail later, the control section 50 specifies whether or not the battery is coupled to the power source circuit 60. In particular, the control section 50 specifies that the battery is coupled to the power source circuit 60 when the battery is physically coupled to the power source circuit 60 and the battery is enabled and coupled to the power source circuit 60. The fact that the battery is physically coupled to the power source circuit 60 and the battery is enabled and coupled to the power source circuit 60 may be simply indicated as the fact that the battery is coupled to the power source circuit 60. When this process is ended, the control section 50 proceeds to the process to Step S14.

In Step S14, the control section 50 executes a USB specifying process. In this process, the control section 50 specifies whether or not a USB device is coupled to the power source circuit 60 and specifies a USB standard. In particular, in a process different from the startup mode setting process, the control section 50 performs enumeration with the USB device when the power is turned on. In a process different from the startup mode setting process, the control section 50 performs enumeration with the USB device by using, as a trigger, a change in the coupling state with the USB device. In this process, the control section 50 determines the coupling state with the USB device based on the result of the enumeration. As a result, the control section 50 specifies whether or not the USB device is coupled and specifies the USB standard. When this process is ended, the control section 50 proceeds to the process to Step S15.

The USB specifying process may be executed before the battery specifying process.

In Step S15, the control section 50 determines whether or not the high power-feeding USB device is coupled. When the control section 50 determines that the high power-feeding USB device is coupled, the process proceeds to Step S20. When the control section 50 determines that the high power-feeding USB device is not coupled, the process proceeds to Step S16.

In Step S16, the control section 50 determines whether or not the battery is coupled. When the control section 50 determines that the battery is coupled, the process proceeds to Step S21. When the control section 50 determines that the battery is not coupled, the process proceeds to Step S17.

The battery specifying process may be executed after whether or not the high power-feeding USB device is coupled has been determined before whether or not the battery is coupled has been determined.

In Step S17, the control section 50 determines whether or not the medium power-feeding USB device is coupled. When the control section 50 determines that the medium power-feeding USB device is coupled, the process proceeds to Step S21. When the control section 50 determines that the medium power-feeding USB device is not coupled, the process proceeds to Step S18.

In Step S18, the control section 50 determines whether or not the low power-feeding USB device is coupled. When the control section 50 determines that the low power-feeding USB device is coupled, the process proceeds to Step S22. When the control section 50 determines that the low power-feeding USB device is not coupled, the process proceeds to Step S19. In Step S19, the control section 50 shuts down.

In Step S20, the control section 50 executes a high output mode setting process for setting the high output mode as information indicating the mode. When this process is ended, the control section 50 ends the startup mode setting process.

In Step S21, the control section 50 executes a medium output mode setting process for setting the medium output mode as information indicating the mode. When this process is ended, the control section 50 ends the startup mode setting process.

In Step S22, the control section 50 executes a low output mode setting process for setting the low output mode as information indicating the mode. When this process is ended, the control section 50 ends the startup mode setting process.

Battery Specifying Process

Next, the battery specifying process will be described with reference to FIG. 8. The battery specifying process is a process that is called in Step S13 of the startup mode setting process in FIG. 7, Step S43 of the normal-time mode setting process in FIG. 9, and Step S61 of a charging control process in FIG. 11.

Figure 8:
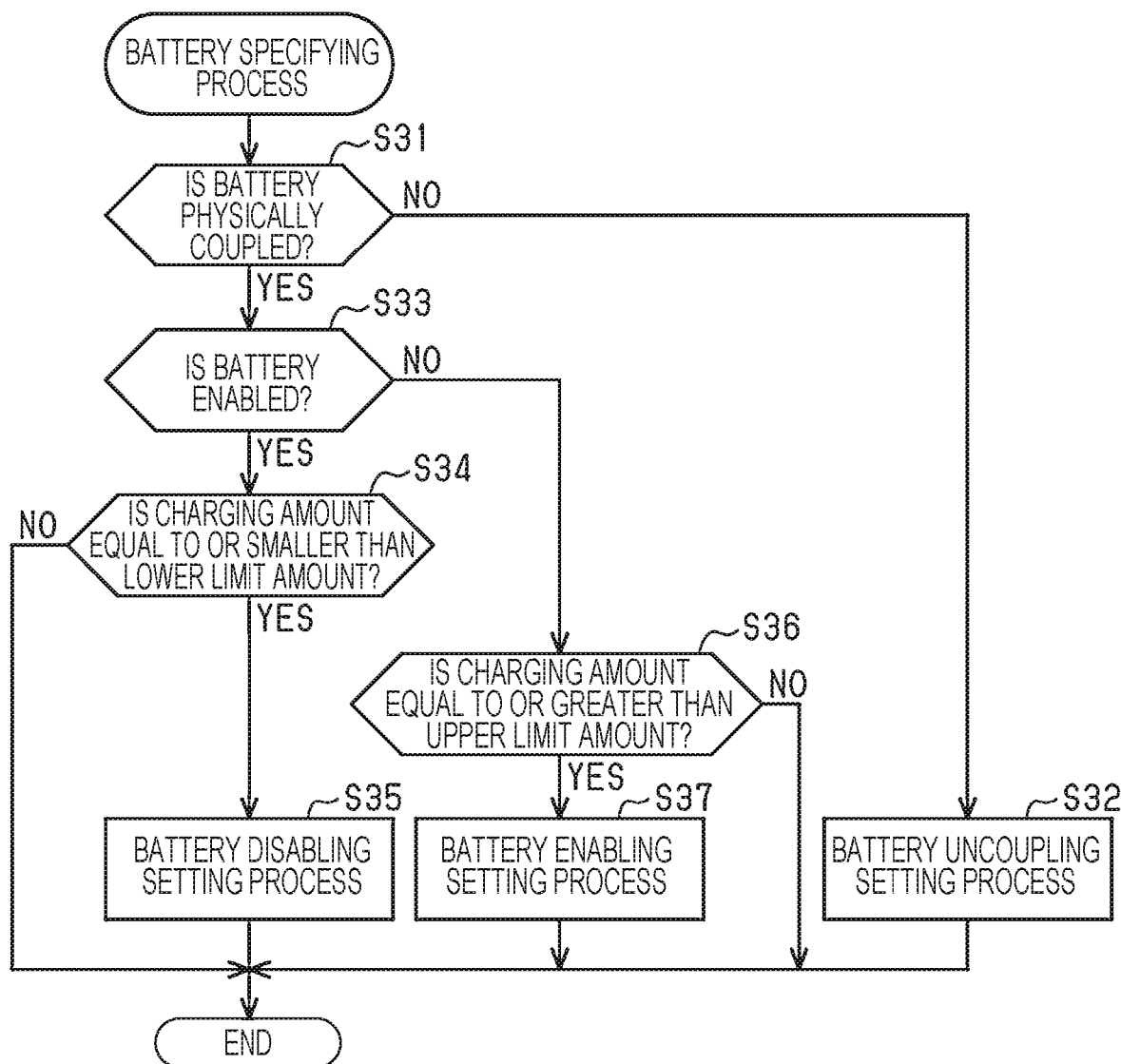
FIG. 8 is a flowchart illustrating a battery specifying process.

As illustrated in FIG. 8, in Step S31, the control section 50 determines whether or not the battery is physically coupled to the power source circuit 60. When the control section 50 determines that the battery is physically coupled, the process proceeds to Step S33. When the control section 50 determines that the battery is not physically coupled, the process proceeds to Step S32.

In Step S32, the control section 50 executes a battery uncoupling setting process for setting the battery to be uncoupled. When this process is ended, the control section 50 ends the battery specifying process. As described above, the control section 50 sets the battery to be uncoupled in a state where the battery is not physically coupled.

In Step S33, the control section 50 determines whether or not the battery is set to be enabled and coupled. As will be described in detail later, when a condition for a charging amount of the battery is satisfied, the control section 50 determines to be in a coupling state where power can be fed from the battery, and sets the battery to be enabled and coupled. When the control section 50 is at the startup in a coupling state where the battery is physically coupled, the control section 50 may set the battery to be disabled and coupled in the initial setting process. When the coupling state is changed from a state where the battery is not physically coupled to a state where the battery is physically coupled, the control section 50 may set the battery to be disabled and coupled. When the control section 50 determines that the battery is set to be enabled and coupled, the process proceeds to Step S34. When the control section 50 determines that the battery is not set to be enabled and coupled, the process proceeds to Step S36.

In Step S34, the control section 50 determines whether or not the charging amount of the battery is equal to or smaller than the lower limit amount. The lower limit amount is a threshold value at which power is not fed from the battery. The lower limit amount may be, for example, 20% of the full charging amount, but is not limited thereto. When the control section 50 determines that the charging amount of the battery is equal to or smaller than the lower limit amount, the process proceeds to Step S35. When the control section 50 determines that the charging amount of the battery is not equal to or smaller than the lower limit amount, the control section 50 ends the battery specifying process. As described above, the control section 50 continues a state where the battery is set to be enabled, when the control section 50 determines the charging amount of the battery is not equal to or smaller than the lower limit amount in the state where the battery is physically coupled, and the battery is set to be enabled and coupled.

In Step S35, the control section 50 executes a battery disabling setting process for setting the battery to be disabled and coupled. When this process is ended, the control section 50 ends the battery specifying process. As described above, the control section 50 sets the battery to be disabled and coupled, when the control section 50 determines the charging amount of the battery is equal to or smaller than the lower limit amount in the state where the battery is physically coupled, and the battery is set to be enabled and coupled.

In Step S36, the control section 50 determines whether or not the charging amount of the battery is equal to or smaller than the upper limit amount. The upper limit amount is a threshold value at which power can be fed from the battery. The upper limit amount may be, for example, 80% of the full charging amount, but is not limited thereto. When the control section 50 determines that the charging amount of the battery is equal to or greater than the upper limit amount, the process proceeds to Step S37. When the control section 50 determines that the charging amount of the battery is not equal to or greater than the upper limit amount, the control section 50 ends the battery specifying process. As described above, the control section 50 continues a state where the battery is set to be disabled, when the control section 50 determines the charging amount of the battery is not equal to or greater than the upper limit amount in the state where the battery is physically coupled, and the battery is set to be disabled and coupled.

In Step S37, the control section 50 executes a battery enabling setting process for setting the battery to be enabled and coupled. As described above, the control section 50 sets the battery to be enabled and coupled, when the control section 50 determines the charging amount of the battery is equal to or greater than the upper limit amount in the state where the battery is physically coupled, and the battery is set to be disabled and coupled. When this process is ended, the control section 50 ends the battery specifying process.

Here, a specific example of control based on the charging amount of the battery will be described. When the charging amount of the battery is equal to or smaller than the lower limit amount in a coupling state in which the battery is physically coupled and the medium power-feeding USB device is coupled, the control section 50 performs control in the medium output mode by using the medium power-feeding USB device as the power supply source instead of the battery. When the charging amount of the battery is equal to or greater than the upper limit amount, the control section 50 performs control in the medium output mode by using the battery as the power supply source.

When the charging amount of the battery is equal to or smaller than the lower limit amount in a coupling state in which the battery is physically coupled and the low power-feeding USB device is coupled, the control section 50 performs control in the low output mode by using the low power-feeding USB device as the power supply source. When the charging amount of the battery is equal to or greater than the upper limit amount, the control section 50 performs control in the medium output mode by using the battery as the power supply source.

Normal-Time Mode Setting Process

Next, a normal-time mode setting process will be described with reference to FIG. 9. The normal-time mode setting process is a process that is called at a predetermined interval after the image reading apparatus 11 is started.

Figure 9:
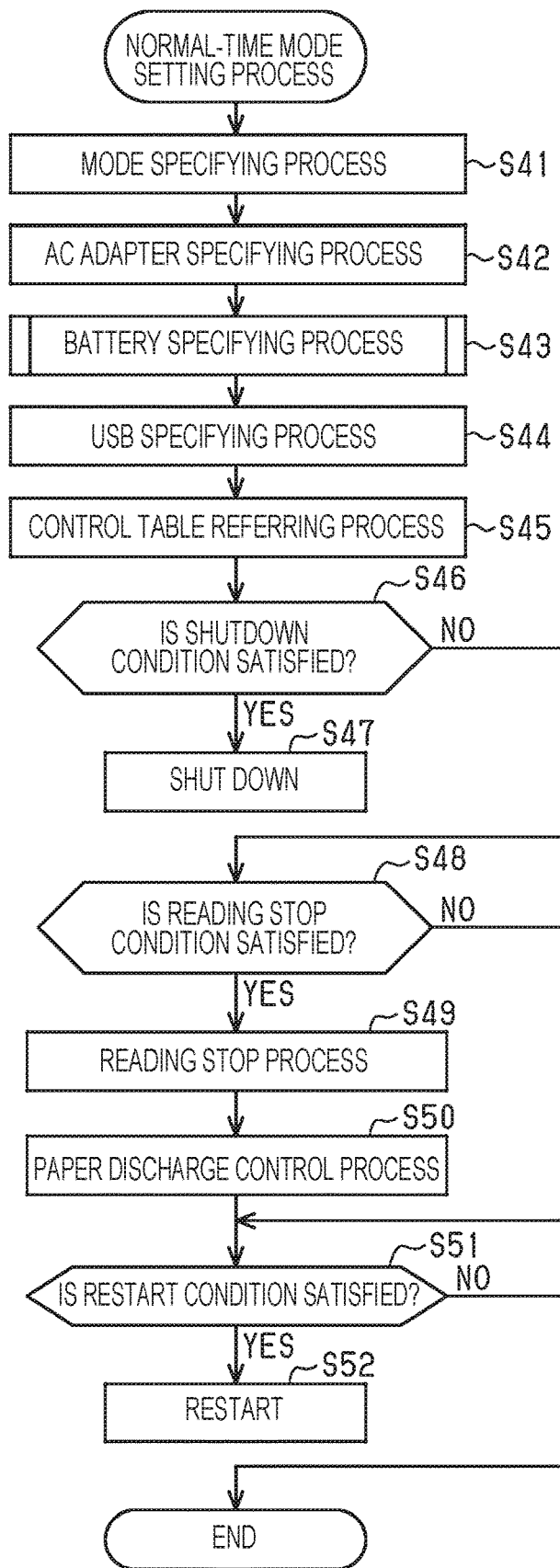
FIG. 9 is a flowchart illustrating a normal-time mode setting process.

As illustrated in FIG. 9, in Step S41, the control section 50 executes a mode specifying process. In this process, the control section 50 reads information indicating the set mode and specifies the current mode. When this process is ended, the control section 50 proceeds to the process to Step S42.

In Step S42, the control section 50 executes the AC adapter specifying process in the same manner as in Step S11 in FIG. 7. In this process, the control section 50 specifies whether or not the AC adapter is coupled to the power source circuit 60. When this process is ended, the control section 50 proceeds to the process to Step S43.

In Step S43, the control section 50 executes the battery specifying process in the same manner as in Step S13 in FIG. 7. In this process, the control section 50 specifies whether or not the battery is coupled to the power source circuit 60. When this process is ended, the control section 50 proceeds to the process to Step S44.

In Step S44, the control section 50 executes the USB specifying process in the same manner as in Step S15 in FIG. 7. When this process is ended, the control section 50 proceeds to the process to Step S45.

In Step S45, the control section 50 executes a control table referring process. In this process, the control section 50 refers to a control table TA illustrated in FIGS. 10A to 10C. The control table TA is a table showing the control contents corresponding to the current mode and the coupling state. When this process is ended, the control section 50 proceeds to the process to Step S46.

Control Table TA

Here, the control table TA will be described with reference to FIGS. 10A to 10C.

As illustrated in FIGS. 10A to 10C, the control table TA is a table relating to the mode and the power supply source. The control table TA is stored in the memory. The control table TA is a table in which the current mode corresponds to reading control. The control table TA is a table in which the coupling state, the control contents, and the power supply source correspond to the current mode and the reading control. In FIGS. 10A to 10C, enabling information is indicated by "Y", disabling information is indicated by "N", and optional information is indicated by "-".

Specifically, the current mode includes the high output mode, the medium output mode, and the low output mode. The current reading control includes information indicating that image reading is being performed based on the reading instruction, information indicating that the image reading based on the reading instruction is not performed, and information indicating arbitrariness.

The coupling state includes a coupling state of the AC adapter, the battery, the high power-feeding USB device, the medium power-feeding USB device, and the low power-feeding USB device. The control contents include a control content related to the reading control, a control content related to system control, and a control content related to the mode. The control content related to the reading control includes information indicating that image reading is stopped, information indicating continuation of image reading, and information indicating arbitrariness. The control content related to the system control includes shutdown, restart, and continuation. The control content related to the mode includes the high output mode, the medium output mode, and the low output mode. The power supply source includes the AC adapter, the battery, the high power-feeding USB device, the medium power-feeding USB device, and the low power-feeding USB device.

As a specific example, in the high output mode, when the control section 50 is in a coupling state where either the AC adapter or the high power-feeding USB device is coupled, the control is continuously performed. As a result, the control is continuously performed in the high output mode. In addition, either the AC adapter or the high power-feeding USB device functions as the power supply source.

In the high output mode, a restart condition is satisfied when the control section 50 is in a coupling state where the AC adapter and the high power-feeding USB device are not coupled and at least one of the battery and the medium power-feeding USB device is coupled. In particular, when image reading is being performed based on the reading instruction, the restart condition is satisfied after a reading stop condition of an image is satisfied. As a result, the control is performed in the medium output mode after the restart. Either the battery or the medium power-feeding USB device functions as the power supply source.

In the high output mode and the medium output mode, when the control section 50 is in a coupling state where the AC adapter, the high power-feeding USB device, the battery, and the medium power-feeding USB device are not coupled and the low power-feeding USB device is coupled, the restart condition is satisfied. In particular, when image reading is being performed based on the reading instruction, the restart condition is satisfied after a reading stop condition of an image is satisfied. As a result, the control is performed in the low output mode after the restart. The low power-feeding USB device functions as the power supply source.

In the medium output mode, when the control section 50 is in a coupling state where the AC adapter and the high power-feeding USB device are not coupled and at least one of the battery and the medium power-feeding USB device is coupled, the control is continuously performed. As a result, the control is continuously performed in the medium output mode. Either the battery or the medium power-feeding USB device functions as the power supply source.

In the medium output mode and the low output mode, when the control section 50 is in a coupling state where either the AC adapter or the high power-feeding USB device is coupled, the restart condition is satisfied. In particular, when image reading is being performed based on the reading instruction, the reading stop condition of an image is not satisfied, and the restart condition is satisfied after the image reading is ended. As a result, the control is performed in the high output mode after the restart. In addition, either the AC adapter or the high power-feeding USB device functions as the power supply source.

In the medium output mode, when the control section 50 is in the coupling state where the AC adapter, the high power-feeding USB device, the battery, and the medium power-feeding USB device are not coupled and the low power-feeding USB device is coupled, the restart condition is satisfied. In particular, when image reading is being performed based on the reading instruction, the restart condition is satisfied after an image reading stop condition is satisfied. As a result, the control is performed in the low output mode after the restart. The low power-feeding USB device functions as the power supply source.

In the low output mode, when the control section 50 is in the coupling state where the AC adapter, the high power-feeding USB device, the battery, and the medium power-feeding USB device are not coupled and the low power-feeding USB device is coupled, the control is continuously performed. As a result, the control is continuously performed in the low output mode. In addition, the low power-feeding USB device continuously functions as the power supply source.

In the low output mode, a restart condition is satisfied when the control section 50 is in the coupling state where the AC adapter and the high power-feeding USB device are not coupled and at least one of the battery and the medium power-feeding USB device is coupled. In particular, when image reading is being performed based on the reading instruction, the reading stop condition of an image is not satisfied, and the restart condition is satisfied after the image reading is ended. As a result, the control is performed in the medium output mode after the restart. Either the battery or the medium power-feeding USB device functions as the power supply source.

In the high output mode, the medium output mode, and the low output mode, when the AC adapter, the battery, the high power-feeding USB device, the medium power-feeding USB device, and the low power-feeding USB device are not coupled, a shutdown condition is satisfied.

Normal-Time Mode Setting Process

Returning to the description of the normal-time mode setting process in FIG. 9, in Step S46, the control section 50 determines whether or not the shutdown condition is satisfied based on the reference result of the control table TA. The shutdown condition is satisfied in a coupling state in which all of the AC adapter, the battery, the high power-feeding USB device, the medium power-feeding USB device, and the low power-feeding USB device are not coupled in all the modes. When the control section 50 does not determine that the shutdown condition is satisfied, the process proceeds to Step S48. When the control section 50 determines that the shutdown condition is satisfied, the process proceeds to Step S47. In Step S47, the control section 50 shuts down. In this case, the control section 50 may stop outputting the image data when image data is output via various communication methods.

In Step S48, the control section 50 determines whether or not the reading stop condition is satisfied based on the reference result of the control table TA. The reading stop condition is satisfied when image reading is being performed based on the reading instruction and the mode transitions to the mode in which the power consumption is small. Specifically, the reading stop condition is satisfied when image reading is being performed based on the reading instruction and the mode transitions from the high output mode to the medium output mode or the low output mode. The reading stop condition is satisfied when image reading is being performed based on the reading instruction and the mode transitions from the medium output mode to the low output mode. When the control section 50 determines that the reading stop condition is satisfied, the process proceeds to Step S49. When the control section 50 determines that the reading stop condition is not satisfied, the process proceeds to Step S51.

In Step S49, the control section 50 executes a reading stop processing. In this process, the control section 50 controls the reading section 40 to stop image reading based on the reading instruction. When this process is ended, the control section 50 proceeds to the process to Step S50.

In Step S50, the control section 50 executes a paper discharge control process. In this process, the control section 50 controls the transport section 21 to discharge the original document D being transported. When this process is ended, the control section 50 proceeds to the process to Step S51.

In Step S51, the control section 50 determines whether or not the restart condition is satisfied based on the reference result of the control table TA. The restart condition is satisfied when the mode transition is required. When the control section 50 does not determine that the restart condition is satisfied, the control section 50 ends the normal-time mode setting process. When the control section 50 determines that the restart condition is satisfied, the process proceeds to Step S52. In Step S52, the control section 50 is restarted. In this case, the control section 50 may stop outputting the image data when image data is output via various communication methods.

Here, a specific example of the power supply source and the mode control will be described.

A case where, in the high output mode, the coupling state is changed from the coupling state where the AC adapter and the high power-feeding USB device are coupled, to a coupling state where the high power-feeding USB device is coupled but the AC adapter is not coupled will be described. In this case, the control section 50 continues the control in the high output mode by using the high power-feeding USB device as the power supply source.

A case where, in the high output mode, the coupling state is changed from the coupling state where the AC adapter is coupled, but the USB device is not coupled, to the coupling state in which the AC adapter and the USB device are coupled will be described. In this case, the control section 50 continuously uses the AC adapter as the power supply source and continues the control in the high output mode.

A case where, in the high output mode, during image reading based on the reading instruction, the coupling state is changed from the coupling state where the AC adapter and the battery are coupled, to the coupling state where the AC adapter is coupled, but the battery is not coupled will be described. In this case, the control section 50 continuously uses the AC adapter as the power supply source and continues the control in the high output mode.

A case where, in the high output mode, during image reading based on the reading instruction, the coupling state is changed from the coupling state where the AC adapter and the medium power-feeding USB device are coupled, to the coupling state where the AC adapter is coupled, but the medium power-feeding USB device is not coupled will be described. In this case, the control section 50 continuously uses the AC adapter as the power supply source and continues the control in the high output mode.

A case where, in the high output mode, during image reading based on the reading instruction, the coupling state is changed from the coupling state where the AC adapter and the low power-feeding USB device are coupled, to the coupling state where the AC adapter is coupled, but the low power-feeding USB device is not coupled will be described. In this case, the control section 50 continuously uses the AC adapter as the power supply source and continues the control in the high output mode.

A case where, in the high output mode, during image reading at 40 ppm based on the reading instruction, the coupling state is changed from the coupling state where the AC adapter and the low power-feeding USB device are coupled, to the coupling state where the AC adapter is not coupled will be described. In this case, the control section 50 stops reading the image at 40 ppm and restarts the process. As a result, after the restart, the control section 50 performs control in the low output mode by using the low power-feeding USB device as the power supply source.

A case where, in the high output mode, during image reading at 5 ppm based on the reading instruction, the coupling state is changed from the coupling state where the AC adapter and the low power-feeding USB device are coupled, to the coupling state where the AC adapter is not coupled will be described. In this case, the control section 50 stops reading the image at 5 ppm and restarts the process. As a result, after the restart, the control section 50 performs control in the low output mode by using the low power-feeding USB device as the power supply source.

A case where, in the low output mode, during image reading at 5 ppm based on the reading instruction, the coupling state is changed from the coupling state where the AC adapter is not coupled and the low power-feeding USB device is coupled, to the coupling state where the AC adapter is coupled will be described. In this case, the control section 50 continues the control in the low output mode by continuously using the low power-feeding USB device as the power supply source. The control section 50 is restarted after image reading at 5 ppm is ended. As a result, after the restart, the control section 50 performs control in the high output mode by using the AC adapter as the power supply source.

A case where, in the high output mode, during image reading at 40 ppm based on the reading instruction, the coupling state is changed from the coupling state where the AC adapter is not coupled and the high power-feeding USB device is coupled, to the coupling state where the AC adapter is coupled will be described. In this case, the control section 50 continues the control in the high output mode by continuously using the high power-feeding USB device as the power supply source. The control section 50 restarts after image reading at 40 ppm is ended. As a result, after the restart, the control section 50 performs control in the high output mode by using the AC adapter as the power supply source.

A case where, in the medium output mode, the coupling state is changed from the coupling state where the AC adapter is not coupled, but the battery is coupled, to the coupling state where the AC adapter is coupled will be described. In this case, the control section 50 restarts. As a result, after the restart, the control section 50 performs control in the high output mode by using the AC adapter as the power supply source.

Charging Control Process

Next, the charging control process will be described with reference to FIG. 11. The charging control process is a process that is called at a predetermined interval after the image reading apparatus 11 is started.

Figure 11:
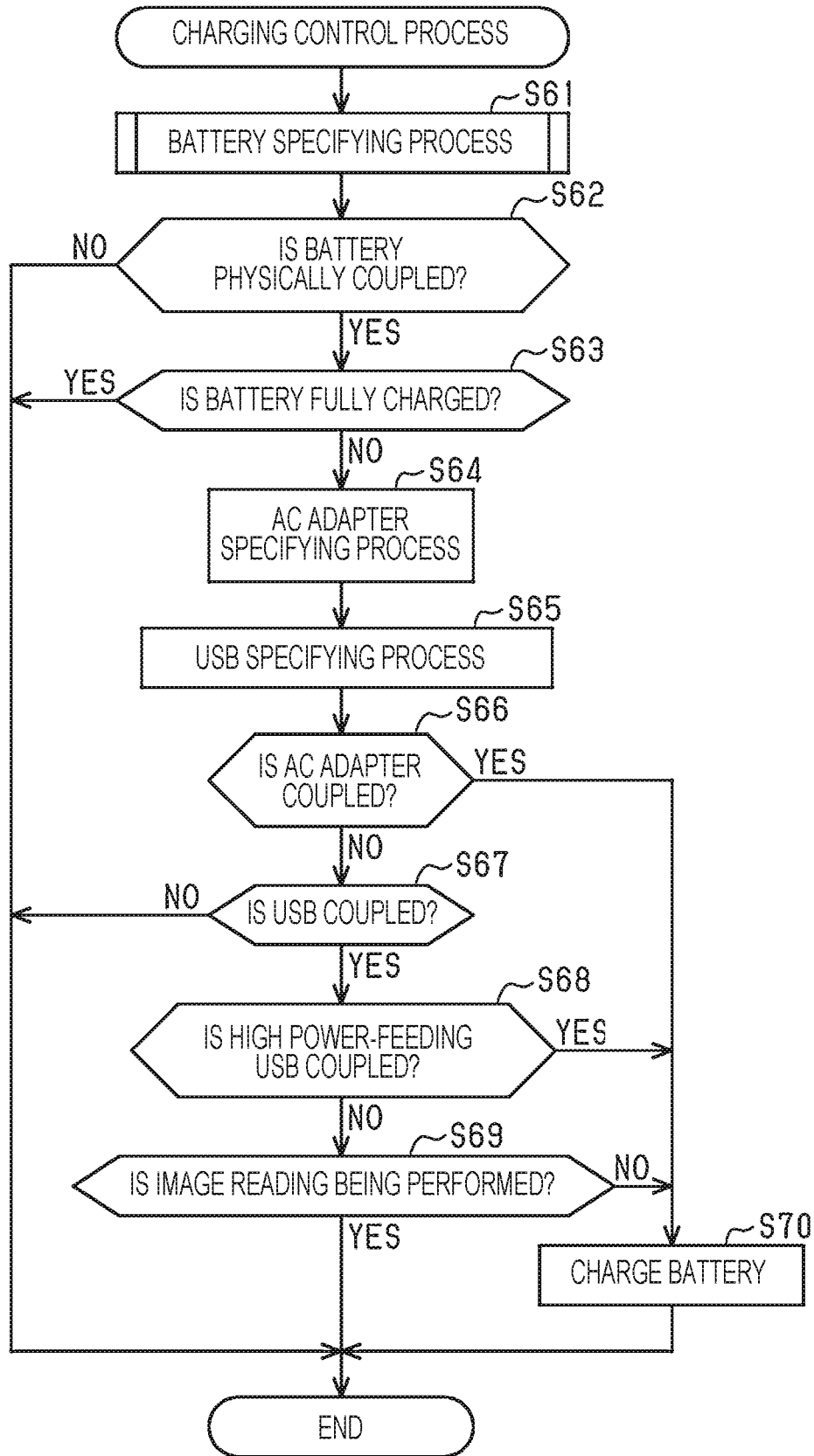
FIG. 11 is a flowchart illustrating a charging control process.

As illustrated in FIG. 11, in Step S61, the control section 50 executes the battery specifying process in the same manner as in Step S13 in FIG. 7. In this process, the control section 50 specifies whether or not the battery is coupled to the power source circuit 60. When this process is ended, the control section 50 proceeds to the process to Step S62.

In Step S62, the control section 50 determines whether or not the battery is physically coupled to the power source circuit 60. When the control section 50 determines that the battery is not physically coupled, the control section 50 ends the charging control process. When the control section 50 determines that the battery is physically coupled, the process proceeds to Step S63.

In Step S63, the control section 50 determines whether or not the charging amount of the battery is full. When the control section 50 determines that the charging amount of the battery is full, the control section 50 ends the charging control process. When the control section 50 determines that the charging amount of the battery is not full, the process proceeds to Step S64.

In Step S64, the control section 50 executes the AC adapter specifying process in the same manner as in Step S11 in FIG. 7. In this process, the control section 50 specifies whether or not the AC adapter is coupled to the power source circuit 60. When this process is ended, the control section 50 proceeds to the process to Step S65.

In Step S65, the control section 50 executes the USB specifying process in the same manner as in Step S15 in FIG. 7. When this process is ended, the control section 50 proceeds to the process to Step S66.

In Step S66, the control section 50 determines whether or not the AC adapter is coupled. When the control section 50 determines that the AC adapter is coupled, the process proceeds to Step S70. When the control section 50 determines that the AC adapter is not coupled, the process proceeds to Step S67.

In Step S67, the control section 50 determines whether or not the USB device is coupled. When the control section 50 determines that the USB device is not coupled, the control section 50 ends the charging control process. When the control section 50 determines that the USB device is coupled, the process proceeds to Step S68.

In Step S68, the control section 50 determines whether or not the high power-feeding USB device is coupled. When the control section 50 determines that the high power-feeding USB device is coupled, the process proceeds to Step S70. When the control section 50 determines that the high power-feeding USB device is not coupled, the process proceeds to Step S69.

In Step S69, the control section 50 determines whether or not image reading is being performed based on the reading instruction. When the control section 50 determines that image reading is being performed based on the reading instruction, the control section 50 ends the charging control process. When the control section 50 determines that the image reading based on the reading instruction is not performed, the process proceeds to Step S70.

In Step S70, the control section 50 charges the battery. In this process, the control section 50 charges the battery coupled to the power source circuit 60. When this process is ended, the control section 50 ends the charging control process.

As described above, the control section 50 can charge the battery when the battery is not fully charged in the coupling state in which the AC adapter is coupled and the battery is physically coupled. The control section 50 can charge the battery when the battery is not fully charged in the coupling state in which the high power-feeding USB device is coupled and the battery is physically coupled. The control section 50 can charge the battery when the battery is not fully charged in the coupling state where the USB device other than high power-feeding USB device is coupled and the battery is physically coupled, and image reading based on the reading instruction is not performed.

That is, in the high output mode, the control section 50 can charge the battery by feeding power from the high power-feeding USB device, in the coupling state where the battery and the high power-feeding USB device are coupled. In the medium output mode and the low output mode, in the coupling state where the battery and the low power-feeding USB device are coupled, the control section 50 does not charge the battery by feeding power from the low power-feeding USB device during image reading based on the reading instruction. In the medium output mode and the low output mode, the control section 50 can charge the battery by feeding power from the low power-feeding USB device when image reading based on the reading instruction is not performed in the coupling state where the battery and the low power-feeding USB device are coupled.

Actions of First Embodiment

The actions of the first embodiment will be described.

Whether or not the AC adapter, the battery, and the USB device are coupled to the power source circuit 60 is monitored. The charging amount of the battery coupled to the power source circuit 60 is also monitored. The power supply source is determined based on the coupling state in which the AC adapter, the battery, and the USB device are coupled to the power source circuit 60. In particular, the power supply source is determined in accordance with the predetermined priority for the coupling state. The power supply source having power of a higher power value that can be fed has a higher priority. Therefore, priority is given to a power supply source capable of feeding power of a high power value. As a result, it is possible to perform control related to the image reading in a stable state.

During image reading based on the reading instruction, the power supply source is not changed when the power range of the power supply source is changed. Thus, it is possible to perform image reading based on the reading instruction in the stable state.

It is possible to perform control in any one of a plurality of types of modes based on the power supply source. In other words, it is possible to perform control in any one of a plurality of types of modes based on the coupling state with the AC adapter, the battery, and the USB device. As described above, it is possible to adjust the power consumption of the image reading apparatus 11 by being controlled in any one of the plurality of types of modes. That is, it is possible to adjust the power consumption of the image reading apparatus 11 to correspond to the power supply source and the mode.

In particular, the control is performed with the control contents corresponding to the set mode. As a result, it is possible to adjust the control contents, the reading speed, and the reading control clock of the control section 50 to correspond to the set mode. Further, it is possible to adjust the document type, the carrier sheet, the double feed detection, the document protection, the posture drive, and the tray drive to correspond to the set mode. In addition, it is possible to adjust the communication method, the liquid crystal display, the touch panel, the USB memory, and the sensor time division control to correspond to the set mode.

The communication method will be described in detail. In the high output mode, the first wireless output process can be executed even both before and after the end of the reading process. In the medium output mode, the first wireless output process is not executed before the end of the reading process, and the first wireless output process can be executed after the end of the reading process. In the low output mode, the second wireless output process is not executed before the end of the reading process, and the second wireless output process can be executed after the end of the reading process. The wired output process has a higher priority than the second wireless output process, and the second wireless output process has a higher priority than the first wireless output process.

When the power range of the power supply source does not change by the change in the coupling state during image reading based on the reading instruction, the image reading based on the reading instruction is continued. In this case, the power supply source can be changed during image reading based on the reading instruction.

When the power range of the power supply source changes to increase by the change in the coupling state during image reading based on the reading instruction, the image reading based on the reading instruction is continued. In this case, the power supply source and the mode are continued without being changed during image reading based on the reading instruction. After the image reading based on the reading instruction is ended, the restart is performed. After the restart, the power supply source and the mode are changed.

When the power range of the power supply source is changed to decrease by the change in the coupling state during image reading based on the reading instruction, image reading based on the reading instruction is stopped, and the restart is performed. After the restart, the power supply source and the mode are changed.

When the charging amount of the battery is equal to or smaller than the lower limit amount, it is determined that the battery is not coupled. When the charging amount of the battery becomes equal to or smaller than the lower limit amount, and then becomes equal to or greater than the upper limit amount, it is determined that the battery is not coupled. As a result, it is possible to perform control related to image reading without decreasing the charging amount of the battery to be equal to or smaller than the lower limit amount.

In a coupling state in which the battery is physically coupled and at least one of the AC adapter and the USB device is coupled, the battery can be charged in the high output mode. On the other hand, in the medium output mode and the low output mode, the battery can be charged when image reading based on the reading instruction is not performed. In the medium output mode and the low output mode, the battery is not charged during image reading based on the reading instruction.

Effects of First Embodiment

The effects of the first embodiment will be described.

1. The plurality of types of modes include the low output mode and the high output mode. The low output mode is a mode that can be controlled in the coupling state in which the low power-feeding USB device capable of feeding power of a power value included within the low power range is coupled. The high output mode is a mode that can be controlled in the coupling state in which the high power-feeding USB device capable of feeding power of a power value included within the power range higher than the low power range is coupled. The high output mode is a mode that can be controlled in the coupling state where the AC adapter capable of feeding power of a power value included within the high power range is coupled. In the low output mode, the control section 50 does not perform image reading at 40 ppm, but can perform image reading at 5 ppm. In the high output mode, the control section 50 can perform image reading at 5 ppm and 40 ppm. Therefore, even when the power range of power that can be fed varies depending on the USB device, it is possible to perform the image reading at 5 ppm in the same manner. On the other hand, even in the same USB device, it is possible to perform image reading at 40 ppm depending on the power range of power that can be fed by the USB device. As described above, it is possible to perform image reading at the reading speed corresponding to the power range of power that can be fed by the USB device. Therefore, it is possible to realize the function related to image reading in accordance with the power consumption.

2. In the high output mode, the control section 50 uses the high power-feeding USB device as the power supply source when the coupling state is changed from the coupling state where the AC adapter and the high power-feeding USB device are coupled, to the coupling state in which the AC adapter is not coupled. In this case, the control section 50 continues the control in the high output mode. Therefore, when the high power-feeding USB device is coupled even in the coupling state in which the AC adapter is not coupled, it is possible to change the power supply source from the AC adapter to the high power-feeding USB device. In addition to this, it is possible to continue the control in the high output mode. Therefore, it is possible to realize the function related to image reading in accordance with the power consumption.

3. In the high output mode, the control section 50 stops the image reading when, during image reading at 40 ppm based on the reading instruction, the coupling state is changed from the coupling state in which the AC adapter and the low power-feeding USB device are coupled, to the coupling state where the AC adapter is not coupled. Therefore, when the coupling state where the AC adapter is not coupled has occurred during image reading at 40 ppm based on the reading instruction, it is possible to stop image reading in a state where the power range of power that can be fed is decreased. Therefore, it is possible to realize the function related to image reading in accordance with the power consumption.

4. In the high output mode, the control section 50 stops the image reading when, during image reading at 5 ppm based on the reading instruction, the coupling state is changed from the coupling state in which the AC adapter and the low power-feeding USB device are coupled, to the coupling state where the AC adapter is not coupled. Therefore, when the coupling state where the AC adapter is not coupled has occurred during image reading at 5 ppm based on the reading instruction, it is possible to stop image reading in a state where the power range of power that can be fed is decreased. Therefore, it is possible to realize the function related to image reading in accordance with the power consumption.

5. In the low output mode, the control section 50 continuously uses the low power-feeding USB device as the power supply source when, during image reading at 5 ppm based on the reading instruction, the coupling state is changed from the coupling state where the low power-feeding USB device is coupled, to the coupling state where the AC adapter is coupled. In this case, the control section 50 continues the control in the low output mode. After image reading at 5 ppm based on the reading instruction is ended, the control section 50 performs control in the high output mode by using the AC adapter as the power supply source. Therefore, even when the coupling state where the AC adapter is coupled has occurred during image reading at 5 ppm based on the reading instruction, the power range of power that can be fed does not increase and the low power-feeding USB device is continuously used as the power supply source. The control in the low output mode is continued. Thus, it is possible to continue image reading in the stable state by continuing without changing the power supply source and the mode during the image reading at 5 ppm based on the reading instruction. Therefore, it is possible to realize the function related to image reading in accordance with the power consumption.

6. In addition to this, by using the AC adapter as the power supply source after the image reading at 5 ppm based on the reading instruction is ended, it is possible to increase the power range of power that can be fed and to start the control in the high output mode. Therefore, it is possible to realize the function related to image reading in accordance with the power consumption.

7. In the high output mode, the control section 50 continuously uses the high power-feeding USB device as the power supply source when, during image reading at 40 ppm based on the reading instruction, the coupling state is changed from the coupling state where the high power-feeding USB device is coupled, to the coupling state where the AC adapter is coupled. In this case, the control section 50 continues the control in the high output mode. After the image reading at 40 ppm is ended, the control section 50 continues the control in the high output mode by using the AC adapter as the power supply source. Therefore, when the high power-feeding USB device is coupled even in the coupling state in which the AC adapter is coupled during image reading at 40 ppm based on the reading instruction, the high power-feeding USB device is continuously used as the power supply source. The control in the high output mode is continued. Thus, it is possible to continue image reading in the stable state by continuing without changing the power supply source and the mode during the image reading at 40 ppm based on the reading instruction. Therefore, it is possible to realize the function related to image reading in accordance with the power consumption.

8. In addition to this, by using the AC adapter as the power supply source after the image reading at 40 ppm is ended, it is possible to change the power supply source to the AC adapter, and to continue the control in the high output mode. Therefore, it is possible to realize the function related to image reading in accordance with the power consumption.

9. The plurality of types of modes include the medium output mode. The medium output mode is a mode that can be controlled in the coupling state in which the medium power-feeding USB device capable of feeding power of a power value included within the medium power range that is higher than the low power range and lower than the high power range is coupled. In the medium output mode, the control section 50 does not perform image reading at 40 ppm, but can perform image reading at 5 ppm and 30 ppm. Therefore, it is possible to perform control in the medium output mode in addition to the low output mode and the high output mode. Even in the same USB device, the power range of power that can be fed by the USB device and the reading speed corresponding to the power range of power that can be fed can vary. Therefore, it is possible to realize the function related to image reading in accordance with the power consumption.

10. In the high output mode, the control section 50 can charge the battery by feeding power from the high power-feeding USB device, in the coupling state where the battery and the high power-feeding USB device are coupled. In the low output mode, in the coupling state where the battery and the low power-feeding USB device are coupled, the control section 50 does not charge the battery by feeding power from the low power-feeding USB device during image reading based on the reading instruction. Therefore, even in the same USB device, it is possible to make a difference whether or not to charge the battery during image reading based on the reading instruction, depending on the power range of power that can be fed by the USB device. In particular, in the coupling state in which the low power-feeding USB device in which the power range of power that can be fed is lower than the high power-feeding USB device is coupled, the battery is not charged during the image reading based on a reading instruction. Thus, it is possible to suppress the power consumption. Therefore, it is possible to realize the function related to image reading in accordance with the power consumption.

11. The plurality of types of modes include the medium output mode. The battery can feed power of a power value included within the medium power range. The medium output mode is a mode that can be controlled in the coupling state in which the battery is coupled. In the medium output mode, the control section 50 does not perform image reading at 40 ppm, but can perform image reading at 5 ppm and 30 ppm. Therefore, it is possible to perform control in the medium output mode in addition to the low output mode and the high output mode. Power can be fed from the battery, and the types of power supply sources and the reading speed corresponding to the power range of power that can be fed can vary. Therefore, it is possible to realize the function related to image reading in accordance with the power consumption.

12. When the charging amount of the battery is equal to or smaller than the lower limit amount in the coupling state in which the battery is physically coupled and the medium power-feeding USB device is coupled, the control section 50 performs control in the medium output mode by using the medium power-feeding USB device as the power supply source. Therefore, when the charging amount of the battery is equal to or smaller than the lower limit amount in the coupling state in which the medium power-feeding USB device capable of feeding power of a power value included within the medium power range is coupled, it is possible to use the medium power-feeding USB device as the power supply source instead of the battery. As a result, it is possible to perform control in the medium output mode without reducing the charging amount of the battery. Therefore, it is possible to realize the function related to image reading in accordance with the power consumption.

13. When the charging amount of the battery is equal to or greater than the upper limit amount in the coupling state in which the battery is physically coupled and the medium power-feeding USB device is coupled, the control section 50 performs control in the medium output mode by using the battery as the power supply source. Therefore, when the charging amount of the battery is equal to or greater than the upper limit amount in the coupling state in which the medium power-feeding USB device capable of feeding power of a power value included within the medium power range is coupled, it is possible to use the battery as the power supply source. As a result, it is possible to perform control in the medium output mode by effectively utilizing the power fed from the battery. Therefore, it is possible to realize the function related to image reading in accordance with the power consumption.

14. When the charging amount of the battery is equal to or smaller than the lower limit amount in a coupling state in which the battery is physically coupled and the low power-feeding USB device is coupled, the control section 50 performs control in the low output mode by using the low power-feeding USB device as the power supply source. Therefore, when the charging amount of the battery is equal to or smaller than the lower limit amount in the coupling state where the low power-feeding USB device having a power range lower than the battery is coupled, it is possible to use the low power-feeding USB device as the power supply source instead of the battery. As a result, it is possible to perform control in the low output mode without reducing the charging amount of the battery. Therefore, it is possible to realize the function related to image reading in accordance with the power consumption.

15. When the charging amount of the battery is equal to or greater than the upper limit amount in the coupling state in which the battery is physically coupled and the low power-feeding USB device is coupled, the control section 50 performs control in the medium output mode by using the battery as the power supply source. Therefore, when the charging amount of the battery is equal to or greater than the upper limit amount in the coupling state in which the low power-feeding USB device having a power range lower than the battery is coupled, it is possible to use the battery as the power supply source. As a result, it is possible to perform control in the medium output mode by effectively utilizing the power fed from the battery having a power range higher than the low power-feeding USB device. Therefore, it is possible to realize the function related to image reading in accordance with the power consumption.

16. In the medium output mode, in the coupling state where the battery and the medium power-feeding USB device are coupled, the control section 50 does not charge the battery by feeding power from the medium power-feeding USB device during image reading based on the reading instruction. Therefore, even in the same USB device, it is possible to make a difference whether or not to charge the battery during image reading based on the reading instruction, depending on the power range of power that can be fed by the USB device. In particular, in the coupling state in which the medium power-feeding USB device in which the power range of power that can be fed is lower than the high power-feeding USB device is coupled, the battery is not charged during the image reading based on a reading instruction. Thus, it is possible to suppress the power consumption. Therefore, it is possible to realize the function related to image reading in accordance with the power consumption.

17. When, in the medium output mode, the coupling state is changed from the coupling state in which the battery is coupled, to the coupling state in which the AC adapter is coupled, the control section 50 performs control in the high output mode by using the AC adapter as the power supply source. Therefore, when the coupling state where the AC adapter having a power range higher than the battery is coupled has occurred, it is possible to use the AC adapter as the power supply source. As a result, it is possible to perform control in the high output mode by effectively utilizing the power fed from the AC adapter without decreasing the charging amount of the battery. Therefore, it is possible to realize the function related to image reading in accordance with the power consumption.

18. The control section 50 does not drive the paper feed tray motor 47 that can move the paper feed tray 16 in the low output mode, but can drive the paper feed tray motor 47 in the high output mode. Therefore, since the paper feed tray motor 47 is not driven in the low output mode in which the power range is lower than the power range in the high output mode, it is possible to reduce the power consumption. Therefore, it is possible to realize the function related to image reading in accordance with the power consumption.

19. The control section 50 does not drive the paper discharge tray motor 48 that can move the paper discharge tray 17 in the low output mode, but can drive the paper discharge tray motor 48 in the high output mode. Therefore, since the paper discharge tray motor 48 is not driven in the low output mode in which the power range is lower than the power range in the high output mode, it is possible to reduce the power consumption. Therefore, it is possible to realize the function related to image reading in accordance with the power consumption.

20. The control section 50 does not drive the posture drive motor 49 driven to change the posture of the housing 12 in the low output mode, but can drive the posture drive motor 49 in the high output mode. Therefore, since the posture drive motor 49 is not driven in the low output mode in which the power range is lower than the power range in the high output mode, it is possible to reduce the power consumption. Therefore, it is possible to realize the function related to image reading in accordance with the power consumption.
21. The control section 50 does not cause the transport section 21 to transport the carrier sheet in the low output mode, but can cause the transport section 21 to transport the carrier sheet in the high output mode. The control section 50 disables the carrier sheet sensor 34 in the low output mode, but enables the carrier sheet sensor 34 in the high output mode. Therefore, in the low output mode having a power range lower than the high output mode, the carrier sheet, which requires more the transporting force than the original document D such as thin paper, is not transported. Thus, it is possible to reduce the power consumption. Further, in the low output mode having a power range lower than the high output mode, it is possible to disable the carrier sheet sensor 34, and to reduce the power consumption. Therefore, it is possible to realize the function related to image reading in accordance with the power consumption.
22. The control section 50 disables the double feed sensor 35 in the low output mode, but enables the double feed sensor 35 in the high output mode. Therefore, in the low output mode having a power range lower than the high output mode, it is possible to disable the double feed sensor 35 and to reduce the power consumption. Therefore, it is possible to realize the function related to image reading in accordance with the power consumption.
23. In the low output mode, the control section 50 can perform time division control of performing switching between the enabling period in which the sensor is enabled and the disabling period in which the sensor is disabled. Therefore, in the low output mode having a power range lower than the high output mode, it is possible to perform the time division control of performing switching between the disabling period in which the sensor is disabled and the enabling period in which the sensor is enabled, and to reduce the power consumption. Therefore, it is possible to realize the function related to image reading in accordance with the power consumption.
24. In the medium output mode, the control section 50 does not execute the first wireless output process before the end of the reading process and can execute the first wireless output process after the end of the reading process. In the high output mode, the control section 50 can execute the first wireless output process even both before and after the end of the reading process. Therefore, differing from the high output mode, the control section 50 does not execute the first wireless output process before the end of the reading process in the medium output mode in which the power range of power that can be fed is lower than the power range in the high output mode. In this manner, it is possible to adjust the execution trigger of the reading process and the first wireless output process in accordance with the power range of power that can be fed. Therefore, it is possible to realize the function related to image reading in accordance with the power consumption.
25. In the high output mode, when the control section 50 is in a coupling state where both the first wireless communication and the wired communication are enabled, the control section 50 can execute the wired output process having power consumption smaller than the power consumption in the first wireless communication with priority over the first wireless output process. Therefore, it is possible to realize the function related to image reading in accordance with the power consumption.
26. In the medium output mode, when the control section 50 causes the image to be read from the original document D of the plurality of sheets based on the input of the reading instruction, the control section 50 does not execute the first wireless output process before the reading process of reading the images from the original document D of the plurality of sheets is ended. In the medium output mode, the control section 50 can execute the first wireless output process after the reading process of reading the images from the original document D of the plurality of sheets is ended. Therefore, in the medium output mode in which the power range of power that can be fed is lower than the power range in the high output mode, it is possible to perform adjustment such that the execution of the reading process and the execution of the first wireless output process do not overlap. Therefore, it is possible to realize the function related to image reading in accordance with the power consumption.
27. Further, it is possible to shorten the time from the start to the end of the reading process of reading an image from an original document D of a plurality of sheets.
28. In the low output mode in which the power range of power that can be fed is lower than the power range in the medium output mode, the control section 50 does not execute the first wireless output process and can execute the second wireless output process having power consumption smaller than the first wireless communication. In this manner, it is possible to adjust the type of wireless communication in accordance with the power range of power that can be fed. Therefore, it is possible to realize the function related to image reading in accordance with the power consumption.
29. The capacitor 60A is a capacitance capable of supplementing the power consumption by the execution of the polling process of the first wireless communication and the second wireless communication. Therefore, it is possible to execute the polling process for recognizing the first wireless communication and the second wireless communication as an enabled coupling state, by using the capacitor 60A having a capacitance capable of supplementing the power consumption by the execution of the polling process. Therefore, it is possible to realize the function related to image reading in accordance with the power consumption.
30. The control section 50 perform enumeration for the coupling state with the USB device, by using, as a trigger, either the power-on or the change in the coupling state with the USB device. The control section 50 determines the coupling state with the USB device based on the result of the enumeration. Therefore, it is possible to determine the coupling state with the USB device by using, as a trigger, either the power-on or the change in the coupling state with the USB device. Therefore, it is possible to realize the function related to image reading in accordance with the power consumption.
31. The notification section 28 performs a notification of the controlled mode. Therefore, the controlled mode can be specified by the user. As a result, it is possible to specify the function related to image reading by the user. Therefore, it is possible to improve the convenience of the user.

Second Embodiment

Next, a second embodiment will be described. In the following description, the same components as those in the embodiment already described are denoted by the same reference signs, and the repetitive description thereof will be omitted or simplified.

In the second embodiment, in the medium output mode, when the control section 50 causes an image to be read from an original document D of a plurality of sheets based on an input of a reading instruction, the control section 50 can execute the first wireless output process after the end of the reading process of reading an image from each of the plurality of sheets of the original document D. In the second embodiment, in the low output mode, when the control section 50 causes an image to be read from an original document D of a plurality of sheets based on an input of a reading instruction, the control section 50 can execute the second wireless output process after the end of the reading process of reading an image from each of the plurality of sheets of the original document D.

Figure 12:
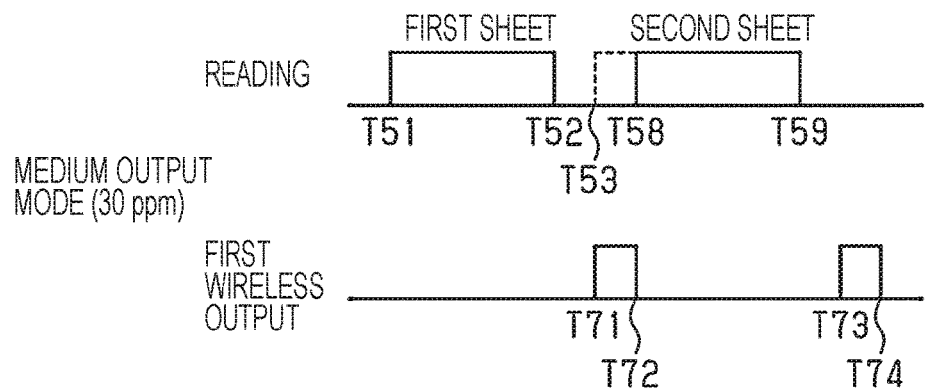
FIG. 12 is a timing chart illustrating a reading timing of an image and an output timing of image data.

As illustrated in FIG. 12, the control section 50 executes a reading process of reading an image from an original document D of two sheets at 30 ppm based on a reading instruction in the medium output mode. In such a case, the control section 50 starts the reading process of reading an image from the first sheet of the original document D at a timing indicated by the reference sign T51. The control section 50 ends the reading process of reading the image from the first sheet of the original document D at a timing indicated by the reference sign T52.

When, at a timing indicated by the reference sign T53, the reading process of reading an image from the second sheet of the original document D can be started, the control section 50 determines whether or not this timing is after the first wireless output process of outputting image data of the first sheet of the original document D has been ended. Before the first wireless output process of outputting the image data of the first sheet of the original document D is ended, the control section 50 does not start the reading process of reading an image from the second sheet of the original document D, and causes the execution of the reading process to wait.

When the control section 50 is in a state where image data of the first sheet of the original document D can be output at a timing indicated by the reference sign T71, the control section starts the first wireless output process of outputting the image data of the first sheet of the original document D before the reading process of reading the image from the second sheet of the original document D is started. The control section 50 ends the first wireless output process of outputting the image data of the first sheet of the original document D at a timing indicated by the reference sign T72.

When the control section 50 determines, at a timing indicated by the reference sign T58, that the current time is after the first wireless output process of outputting the image data of the first sheet of the original document D has been ended, the control section 50 starts the reading process of reading an image from the second sheet of the original document D. The control section 50 ends the reading process of reading the image from the second sheet of the original document D at a timing indicated by the reference sign T59.

When a timing indicated by the reference sign T73 is after the control section 50 is in a state where image data of the second sheet of the original document D can be output, and after the reading process of reading the image from the second sheet of the original document D is ended, the control section 50 starts the first wireless output process of outputting the image data of the second sheet of the original document D. The control section 50 ends the first wireless output process of outputting the image data of the second sheet of the original document D at a timing indicated by the reference sign T74.

As described above, in the medium output mode, when the control section 50 causes the image to be read from the original document D of the plurality of sheets based on the input of the reading instruction, the control section 50 does not execute the first wireless output process before the reading process of reading the image from each of the plurality of sheets of the original document D is ended. Then, in the medium output mode, the control section 50 can execute the first wireless output process after the end of the reading process of reading an image from each of a plurality of sheets of the original document D and before the start of the reading process of reading an image from the next original document D.

Similarly, in the low output mode, when the control section 50 causes the image to be read from the original document D of the plurality of sheets based on the input of the reading instruction, the control section 50 does not execute the second wireless output process before the reading process of reading the images from each of the plurality of sheets of the original document D is ended. Then, in the low output mode, the control section 50 can execute the second wireless output process after the end of the reading process of reading an image from each of a plurality of sheets of the original document D and before the start of the reading process of reading an image from the next original document D.

Effects of Second Embodiment

The effects of the second embodiment will be described.
32. In the medium output mode, the control section 50 can execute the first wireless output process after the reading process of reading an image from each of the plurality of sheets of the original documents D has been ended. As described above, in the medium output mode in which the power range of power that can be fed is lower than the power range in the high output mode, it is possible to perform adjustment such that the execution of the reading process and the execution of the first wireless output process do not overlap. Therefore, it is possible to realize the function related to image reading in accordance with the power consumption.
33. Further, it is possible to accelerate the execution timing of the first wireless communication for outputting the image data of the image read from each of the plurality of sheets of the original document D.

Third Embodiment

Next, a third embodiment will be described.

In the third embodiment, in the medium output mode, when the control section 50 causes an image to be read from an original document D of a plurality of sheets based on an input of a reading instruction, the control section 50 can execute the first wireless output process after the end of the reading process of reading an image from a predetermined number of sheets in an original document D having a plurality of sheets. In the third embodiment, in the low output mode, when the control section 50 causes an image to be read from an original document D of a plurality of sheets based on an input of a reading instruction, the control section 50 can execute the second wireless output process after the end of the reading process of reading an image from a predetermined number of sheets in an original document D having a plurality of sheets.

Figure 13:
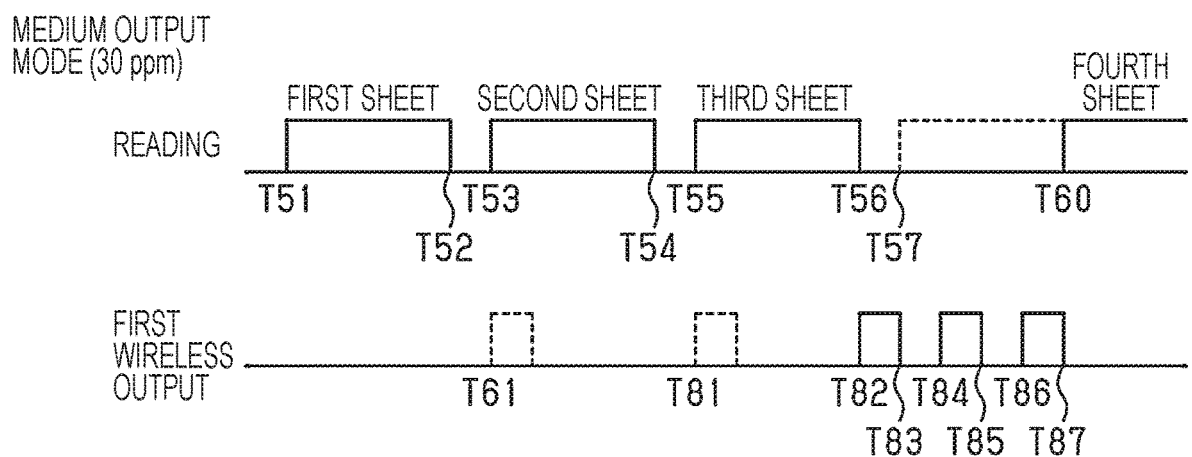
FIG. 13 is a timing chart illustrating a reading timing of an image and an output timing of image data.

As illustrated in FIG. 13, the control section 50 executes a reading process of reading an image from an original document D of four sheets or more at 30 ppm based on a reading instruction in the medium output mode. The predetermined number of sheets is set to, for example, three. In such a case, the control section 50 starts the reading process of reading an image from the first sheet of the original document D at a timing indicated by the reference sign T51. The control section 50 ends the reading process of reading the image from the first sheet of the original document D at a timing indicated by the reference sign T52.

The control section 50 starts the reading process of reading the image from the second sheet of the original document D at a timing indicated by the reference sign T53. The control section 50 ends the reading process of reading the image from the second sheet of the original document D at a timing indicated by the reference sign T54.

The control section 50 starts the reading process of reading the image from the third sheet of the original document D at a timing indicated by the reference sign T55. The control section 50 ends the reading process of reading the image from the third sheet of the original document D at a timing indicated by the reference sign T56.

When the control section 50 is in a state where the image data of the first sheet of the original document D can be output at a timing indicated by the reference sign T61, the control section 50 determines whether or not the current time is after the reading process of reading an image from the third sheet of the original document D is ended. When the control section 50 determines that the current time is before the reading process of reading an image from the third sheet of the original document D is ended, the control section 50 does not start the first wireless output process of outputting the image data of the first sheet of the original document D, and causes the execution of the first wireless output process to wait.

When the control section 50 is in a state where the image data of the second sheet of the original document D can be output at a timing indicated by the reference sign T81, the control section 50 determines whether or not the current time is after the reading process of reading an image from the third sheet of the original document D is ended. When the control section 50 determines that the current time is before the reading process of reading an image from the third sheet of the original document D is ended, the control section 50 does not start the first wireless output process of outputting the image data of the second sheet of the original document D, and causes the execution of the first wireless output process to wait.

When the control section 50 determines, at a timing indicated by the reference sign T82, that the current time is after the reading process of reading the image from the third sheet of the original document D has been ended, the control section 50 starts the first wireless output process of outputting image data of the first sheet of the original document D. The control section 50 ends the first wireless output process of outputting the image data of the first sheet of the original document D at a timing indicated by the reference sign T83.

When the control section 50 determines that the current time is after the reading process of reading an image from the third sheet of the original document D is ended, at a timing indicated by the reference sign T84, the control section 50 starts the first wireless output process of outputting the image data of the second sheet of the original document D. The control section 50 ends the first wireless output process of outputting the image data of the second sheet of the original document D at a timing indicated by the reference sign T85.

When, at a timing indicated by the reference sign T86, the control section 50 is in a state where image data of the third sheet of the original document D can be output and the timing is after the reading process of reading the image from the third sheet of the original document D has been ended, the control section 50 starts the first wireless output process of outputting image data of the third sheet of the original document D. The control section 50 ends the first wireless output process of outputting the image data of the third sheet of the original document D at a timing indicated by the reference sign T87.

When, at a timing indicated by the reference sign T57, the reading process of reading an image from the fourth sheet of the original document D can be started, the control section 50 determines whether or not this timing is after the first wireless output process of outputting image data of the third sheet of the original document D has been ended. When the control section 50 determines that the current times is before the end of the first wireless output process of outputting the image data of the third sheet of the original document D, the control section 50 does not start the reading process of reading an image from the fourth sheet of the original document D, and causes the execution of the reading process to wait.

When the control section 50 determines, at a timing indicated by the reference sign T60, that the current time is after the end of the first wireless output process of outputting the image data of the third sheet of the original document D, the control section 50 starts the reading process of reading an image from the fourth sheet of the original document D.

Further, the control section 50 executes the first wireless output process of outputting image data of an original document D having a predetermined number of sheets, such as 3, 6, and 9 sheets, every time the reading process of reading an image from the predetermined number of sheets of the original document D has been ended.

As described above, in the medium output mode, when the control section 50 causes the image to be read from the original document D of the plurality of sheets based on the input of the reading instruction, the control section 50 does not execute the first wireless output process before the reading process of reading the image from a predetermined number of sheets in the original document D of a plurality of sheets is ended. In the medium output mode, the control section 50 can execute the first wireless output process after the reading process of reading the images from a predetermined number of sheets in the original document D of the plurality of sheets is ended.

Similarly, in the low output mode, when the control section 50 causes the image to be read from the original document D of the plurality of sheets based on the input of the reading instruction, the control section 50 does not execute the second wireless output process before the reading process of reading the images from a predetermined number of sheets in the original document D of a plurality of sheets is ended. In the low output mode, the control section 50 can execute the second wireless output process after the reading process of reading the images from the predetermined number of sheets in the original document D of the plurality of sheets is ended.

Effects of Third Embodiment

34. In the medium output mode, the control section 50 can execute the first wireless output process after the reading process of reading the images from a predetermined number of sheets in the original document D of the plurality of sheets has been ended. As described above, in the medium output mode in which the power range of power that can be fed is lower than the power range in the high output mode, it is possible to perform adjustment such that the execution of the reading process and the execution of the first wireless output process do not overlap. Therefore, it is possible to realize the function related to image reading in accordance with the power consumption.

35. Further, it is possible to shorten the time from the start to the end of the reading process of reading an image from a predetermined number of sheets in the original document D of a plurality of sheets. The first wireless output process can be executed at a timing in consideration of the data volume of the image data of an original document D having a predetermined number of sheets that can be stored in the image data storage section 54A.

MODIFICATION EXAMPLES

The present embodiment can be changed and implemented as follows. The present embodiment and the following modification examples can be implemented in combination with each other within a technically consistent range.

In the above embodiments, the image reading apparatus 11 may include the battery, for example, as long as the image reading apparatus 11 can be coupled to the battery. That is, the image reading apparatus 11 may have a built-in battery, for example.

In the above embodiments, the control section 50 functions as the image processing section 54. For example, in the low output mode, the control section 50 may output a digital signal itself from the analog front end 56 without performing image processing. For example, in the low output mode and the medium output mode, the control section 50 may output the digital signal itself from the analog front end 56 without performing image processing.

In the above embodiments, for example, the image reading apparatus 11 may include a sensor different from the plurality of sensors related to image reading. For example, the image reading apparatus 11 may not include at least one of the plurality of sensors related to image reading.

In the above embodiments, for example, at least one of the movement of the paper feed tray 16, the movement of the paper discharge tray 17, and the change of the posture of the housing 12 may be realized by a user operation. As a result, even when at least one of the movement of the paper feed tray 16, the movement of the paper discharge tray 17, and the change of the posture of the housing 12 is disabled, it can be realized by the user operation. For example, at least one of the movement of the paper feed tray 16, the movement of the paper discharge tray 17, and the change of the posture of the housing 12 may not be realized by driving the drive source. That is, for example, the paper feed tray 16 does not have to move. Further, for example, the paper discharge tray 17 does not have to move. Further, for example, the posture of the housing 12 does not have to be changed.

In the above embodiments, for example, the control section 50 may increase the illumination of a backlight of the liquid crystal display section 30 in the high output mode and the medium output mode, and decrease the illumination of the backlight of the liquid crystal display section 30 in the low output mode.

In the above embodiments, for example, the control section 50 may disable the notification section 28 in the low output mode.

In the above embodiments, for example, the image reading apparatus 11 does not have to include the touch panel 29. For example, the image reading apparatus 11 does not have to include the liquid crystal display section 30. For example, the image reading apparatus 11 does not have to include the operation section 27. For example, the image reading apparatus 11 does not have to include the notification section 28.

In the above embodiments, for example, the control section 50 may display an image on the liquid crystal display section 30, that can specify the controlled mode. That is, the liquid crystal display section 30 may be a notification section that performs a notification of the controlled mode.

In the third embodiment, for example, the predetermined number of sheets may be predetermined. Further, for example, the predetermined number of sheets may differ depending on the size of the image data. Further, for example, the predetermined sheet may be at least storable in the image data storage section 54A, and may or may not be an upper limit storable in the image data storage section 54A.

In the second embodiment and the third embodiment, the control section 50 may, for example, divide an output process period for outputting the image data from an original document D of one sheet into a plurality of non-continuous periods. As a specific example, the control section 50 may execute the wireless output process for the original document D of one sheet after the end of the reading process for a first original document D and before the start of the reading process for the next second original document D. In addition, the control section 50 may suspend the execution of the wireless output process by using, as a trigger, the start of the reading process for the second original document D. The control section 50 may restart the execution of the suspended wireless output process after the end of the reading process for the second original document D and before the start of the reading process for the next third original document D. As a result, it is possible to shorten the time from the start to the end of the reading process of reading an image from an original document D of a plurality of sheets. Further, it is possible to accelerate the execution timing of the wireless communication for outputting the image data of the images read from the plurality of sheets of the original document D.

In the above embodiments, for example, when the control section 50 outputs image data via various communication methods, the control section 50 may output the image data again after the restart. That is, the control section 50 may suspend the output of the image data when image data is output via various communication methods. In this case, the control section 50 may restart the output of the image data from the time of suspension, or may restart the output of the image data in units of the original document D.

In the above embodiments, for example, when the control section 50 outputs image data via various communication methods, and the reading stop condition is not satisfied, but the restart condition is satisfied, the control section 50 may perform restart after ending the output of the image data.

In the above embodiments, the first wireless communication may be another wireless communication other than, for example, Wi-Fi (registered trademark). The second wireless communication may be, for example, another wireless communication other than Bluetooth (registered trademark). That is, the first wireless communication is preferably wireless communication having power consumption higher than the second wireless communication. The first wireless communication may be, for example, Bluetooth (registered trademark). For example, it may not be possible to execute the second wireless communication.

In the above embodiments, for example, in the low output mode, the second wireless output process may be able to be executed even both before and after the end of the reading process. For example, in the low output mode, the first wireless output process is not executed before the end of the reading process, and the first wireless output process may be able to be executed after the end of the reading process.

In the above embodiments, for example, in the high output mode, the second wireless output process may be executed with priority over the wired output process. For example, in the high output mode, the first wireless output process may be executed with priority over the wired output process. For example, in the high output mode, the first wireless output process may be executed with priority over the second wireless output process.

In the above embodiments, for example, in the medium output mode, the second wireless output process may be executed with priority over the wired output process. For example, in the medium output mode, the first wireless output process may be executed with priority over the wired output process. For example, in the medium output mode, the first wireless output process may be executed with priority over the second wireless output process.

In the above embodiments, for example, in the low output mode, the second wireless output process may be executed with priority over the wired output process. For example, in the low output mode, the first wireless output process may be executed with priority over the wired output process. For example, in the low output mode, the first wireless output process may be executed with priority over the second wireless output process.

In the above embodiments, as the first device, for example, at least one of the medium power-feeding USB device and the battery may be included, and other devices may be included. Further, as the second device, for example, at least one of the high power-feeding USB device and the AC adapter may be included, and other devices may be included.

In the above embodiments, for example, when at least one of the AC adapter and the high power-feeding USB device is coupled, the control section 50 may perform control in either the medium output mode or the low output mode instead of the high output mode.

In the above embodiments, in the medium output mode, the control section 50 may control the control contents that is controlled in the same manner as in the low output mode, for example, to be different from the control contents in the low output mode and to be the same as the control contents in the high output mode. As a specific example, the control section 50 may control the double feed sensor 35 to be enabled in the high output mode and the medium output mode.

In the above embodiments, in the medium output mode, the control section 50 may control the control contents that is controlled in the same manner as in the high output mode, for example, to be different from the control contents in the high output mode and to be the same as the control contents in the low output mode. As a specific example, the control section 50 does not have to drive the posture drive motor 49 in the medium output mode and the low output mode.

In the above embodiments, for example, the control section 50 may control at least one of the control contents corresponding to the plurality of types of modes illustrated in FIG. 4.

In the above embodiments, for example, in the high output mode and the medium output mode, the control section 50 may continue image reading without being stopped, when the power of a power value included within the low power range is fed by the change in the coupling state during the image reading at 5 ppm based on the reading instruction. In this case, for example, the control section 50 may perform control in the low output mode during image reading based on the reading instruction, or may perform control in the low output mode after image reading based on the reading instruction is ended. For example, the control section 50 does not have to be restarted.

In the above embodiments, for example, in the high output mode, the control section 50 may continue image reading without being stopped, when the power of a power value included within the medium power range is fed by the change in the coupling state during the image reading at 30 ppm based on the reading instruction. In this case, for example, the control section 50 may perform control in the medium output mode during image reading based on the reading instruction, or may perform control in the medium output mode after image reading based on the reading instruction is ended. For example, the control section 50 does not have to be restarted.

In the above embodiments, for example, in the medium output mode and the low output mode, the control section 50 may continue image reading without being stopped, when the power of a power value included within the high power range is fed by the change in the coupling state during the image reading at 5 ppm based on the reading instruction. In this case, for example, the control section 50 may perform control in the high output mode during image reading based on the reading instruction, or may perform control in the high output mode after image reading based on the reading instruction is ended. For example, the control section 50 may use, as the power supply source, a device corresponding to the high output mode during image reading based on the reading instruction, and may use, as the power supply source, a device corresponding to the high output mode after the image reading based on the reading instruction is ended. For example, the control section 50 does not have to be restarted.

In the above embodiments, for example, in the low output mode, the control section 50 may continue image reading without being stopped, when the power of a power value included within the medium power range is fed by the change in the coupling state during the image reading at 5 ppm based on the reading instruction. In this case, for example, the control section 50 may perform control in the medium output mode during image reading based on the reading instruction, or may perform control in the medium output mode after image reading based on the reading instruction is ended. For example, the control section 50 may use, as the power supply source, a device corresponding to the medium output mode during image reading based on the reading instruction, and may use, as the power supply source, a device corresponding to the medium output mode after the image reading based on the reading instruction is ended. For example, the control section 50 does not have to be restarted.

In the above embodiments, for example, in the medium output mode, the control section 50 may continue image reading without being stopped, when the power of a power value included within the high power range is fed by the change in the coupling state during the image reading at 30 ppm based on the reading instruction. In this case, for example, the control section 50 may perform control in the high output mode during image reading based on the reading instruction, or may perform control in the high output mode after image reading based on the reading instruction is ended. For example, the control section 50 may use, as the power supply source, a device corresponding to the high output mode during image reading based on the reading instruction, and may use, as the power supply source, a device corresponding to the high output mode after the image reading based on the reading instruction is ended. For example, the control section 50 does not have to be restarted.

In the above embodiments, for example, the control section 50 does not have to be restarted when the mode is changed. For example, the control section 50 does not have to be restarted when the mode is changed such that the power range is low. For example, the control section 50 does not have to be restarted when the mode is changed such that the power range is high.

In the above embodiments, for example, the image reading apparatus 11 may be configured to read an image at a reading speed of any one of two types and four or more types. For example, the reading speed may be any speed.

In the above embodiments, four standards are exemplified for the USB standard, but the present disclosure is not limited to this. For example, the present disclosure may be applied to two standards, three standards, and five or more standards. That is, at least, it is sufficient that a plurality of USB devices capable of feeding power of a power value included within different power ranges can be coupled. Further, for example, each power range may be any range.

In the above embodiments, for example, the image reading apparatus 11 may include a plurality of USB coupling portions 64. That is, the image reading apparatus 11 can be coupled to a plurality of USB devices. In this case, the control section 50 may determine the power supply source in accordance with the priority among the plurality of USB devices. Further, the control section 50 may control the mode in accordance with the priority among the plurality of USB devices.

In the above embodiments, for example, the USB device may be a host device or a client device.

In the above embodiments, for example, the AC adapter, the battery, and the USB device may have any power range. Further, for example, as long as power of the power values included within the same power range can be fed to the AC adapter, the battery, and the USB device, the power values themselves may be the same or different.

In the above embodiments, five power supply sources of the AC adapter, the battery, the high power-feeding USB device, the medium power-feeding USB device, and the low power-feeding USB device are exemplified, but the present disclosure is not limited thereto. For example, the image reading apparatus 11 may be capable of feeding power from any one of two or more, four or less, or six or more power supply sources. That is, the power supply source may include, for example, a power supply source different from the above-exemplified power supply sources, and does not have to include, for example, at least one of the above-exemplified power supply sources.

In the above embodiments, three modes are adopted as the plurality of modes, but the present disclosure is not limited to this. For example, as the plurality of modes, any two or four or more modes may be adopted.

In the above embodiments, for example, the control section 50 does not have to perform enumeration with the USB device when the power is turned on. For example, the control section 50 does not have to perform the enumeration with the USB device, by using, as a trigger, the change in the coupling state with the USB device. That is, the control section 50 may perform the enumeration with the USB device, by using, as a trigger, at least one of power-on and the change in the coupling state with the USB device.

In the above embodiments, various controls are performed on condition that image reading based on the reading instruction is not performed, but the present disclosure is not limited to this. For example, when the reading section 40 actually does not read an image even during image reading based on the reading instruction, various controls may be performed. That is, in the control period based on the reading instruction, various types of control may be performed during a non-reading period in which the reading section 40 actually does not read an image. As described above, various controls may be performed on condition that the image reading is not performed. Various controls may include, for example, a change of the power supply source, a change of the mode, the wireless communication, and charging of the battery.

In the above embodiments, when the image reading is being performed for a long time even though the charging amount of the battery is equal to or greater than the upper limit amount, the control section 50 may perform control in the low output mode without using the battery as the power supply source.

The image sensor 42 is not limited to a CMOS image sensor. The image sensor 42 may be, for example, a metal oxide semiconductor (MOS) image sensor, or may be, for example, a charge coupled device (CCD) image sensor.

The image sensor 42 is not limited to a linear image sensor, and may be, for example, an area image sensor.

The material of the original document is not limited to paper, and may be, for example, a resin film or sheet, a woven fabric, a metal film, or the like.

The image reading apparatus may be a portion of a multifunction device having a printing function and a copying function in addition to a scanner function.

The image reading apparatus is not limited to a sheet feed type, but may be a flatbed type. The flatbed type image reading apparatus includes a carriage and a carriage motor. The carriage can move in the main scanning direction D2 by driving the carriage motor. The reading section is mounted on the carriage.

The present disclosure is applicable to an image reading apparatus, but is also applicable to a control method of the image reading apparatus.

Additional Notes

Hereinafter, the technical ideas and the actions and effects grasped from the above-described embodiments and modification examples will be described.

A1. An image reading apparatus includes a reading section configured to read an image from an original document, and a control section configured to perform control related to image reading. The control section is configured to perform control in any one of a plurality of types of modes. The plurality of types of modes include a low output mode and a high output mode. The low output mode is a mode configured to be controlled in a coupling state where a low power-feeding USB device configured to feed power of a power value included within a low power range is coupled. The high output mode is a mode configured to be controlled in a coupling state where a high power-feeding USB device configured to feed power of a power value included within a high power range higher than the low power range is coupled. The reading section is configured to read an image at either a first reading speed or a second reading speed faster than the first reading speed. The control section is configured not to perform image reading at the second reading speed and to perform image reading at the first reading speed in the low output mode. The control section is configured to perform image reading at the first reading speed and the second reading speed in the high output mode.

According to this configuration, even when the power range of power that can be fed varies depending on the USB device, it is possible to read an image at the first reading speed in the same manner. On the other hand, even in the same USB device, it is possible to read an image at the second reading speed faster than the first reading speed, depending on the power range of power that can be fed by the USB device. As described above, it is possible to perform image reading at the reading speed corresponding to the power range of power that can be fed by the USB device. Therefore, it is possible to realize the function related to image reading in accordance with the power consumption.

- B1. The high output mode is a mode that can be controlled in a coupling state where an AC adapter capable of feeding power of the power value included within the high power range is coupled. According to this configuration, it is possible to exhibit the same effect as in A1.
- C1. The control section may perform control in the high output mode by using the AC adapter as a power supply source in a coupling state where the AC adapter and the high power-feeding USB device are coupled, and continue the control in the high output mode by using the high power-feeding USB device as the power supply source when a coupling state is changed from the coupling state where the AC adapter and the high power-feeding USB device are coupled, to a coupling state where the high power-feeding USB device is coupled, but the AC adapter is not coupled in the high output mode.

According to this configuration, when the high power-feeding USB device is coupled even in a coupling state in which the AC adapter is not coupled, it is possible to change the power supply source from the AC adapter to the high power-feeding USB device, and to continue control in the high output mode. Therefore, it is possible to realize the function related to image reading in accordance with the power consumption.

- D1. The control section may perform control in the high output mode by using the AC adapter as a power supply source in a coupling state where the AC adapter and the low power-feeding USB device are coupled, and stop image reading at the second reading speed when a coupling state is changed from the coupling state where the AC adapter and the low power-feeding USB device are coupled, to a coupling state where the low power-feeding USB device is coupled, but the AC adapter is not coupled during the image reading at the second reading speed in the high output mode.

According to this configuration, when a coupling state where the AC adapter is not coupled has occurred during image reading at the second reading speed, it is possible to stop the image reading in a state where the power range of power that can be fed is decreased. Therefore, it is possible to realize the function related to image reading in accordance with the power consumption.

- E1. The control section may perform control in the high output mode by using the AC adapter as a power supply source in a coupling state where the AC adapter and the low power-feeding USB device are coupled, and stop image reading at the first reading speed when a coupling state is changed from the coupling state where the AC adapter and the low power-feeding USB device are coupled, to a coupling state where the low power-feeding USB device is coupled, but the AC adapter is not coupled during the image reading at the first reading speed in the high output mode.

According to this configuration, even though the low power-feeding USB device is coupled when the coupling state where the AC adapter is not coupled has occurred during image reading at the first reading speed, the power range of power that can be fed is decreased. As a result, control of not continuing and stopping image reading is performed in a state where the power range of power that can be fed is decreased even during image reading at the first reading speed. Therefore, it is possible to realize the function related to image reading in accordance with the power consumption.

- F1. The control section may perform control in the low output mode by using the low power-feeding USB device as a power supply source in a coupling state where the low power-feeding USB device is coupled without the AC adapter coupled, continue the control in the low output mode by continuously using the low power-feeding USB device as the power supply source when a coupling state is changed from the coupling state where the low power-feeding USB device is coupled without the AC adapter coupled, to a coupling state where the AC adapter and the low power-feeding USB device are coupled during image reading at the first reading speed in the low output mode, and perform control in the high output mode by using the AC adapter as the power supply source, after image reading at the first reading speed is ended.

According to this configuration, even when the coupling state where the AC adapter is coupled has occurred during image reading at the first reading speed, the power range of power that can be fed does not increase, and the low power-feeding USB device is continuously used as the power supply source. In addition, the control in the low output mode is continued. Thus, it is possible to continue image reading in the stable state by continuing without changing the power supply source and the mode during the image reading at the first reading speed. Therefore, it is possible to realize the function related to image reading in accordance with the power consumption.

In addition to this, by using the AC adapter as the power supply source after the image reading at the first reading speed is ended, it is possible to increase the power range of power that can be fed and to start the control in the high output mode. Therefore, it is possible to realize the function related to image reading in accordance with the power consumption.

- G1. The control section may perform control in the high output mode by using the high power-feeding USB device as a power supply source in a coupling state where the high power-feeding USB device is coupled without the AC adapter coupled, continue the control in the high output mode by continuously using the high power-feeding USB device as the power supply source when a coupling state is changed from the coupling state where the high power-feeding USB device is coupled without the AC adapter coupled, to a coupling state where the AC adapter and the high power-feeding USB device are coupled during image reading at the second reading speed in the high output mode, and continue the control in the high output mode by using the AC adapter as the power supply source, after the image reading at the second reading speed is ended.

According to this configuration, when the high power-feeding USB device is coupled even in the coupling state where the AC adapter is coupled during image reading at the second reading speed, the high power-feeding USB device is continuously used as the power supply source, and the control in the high output mode is continued. Thus, it is possible to continue image reading in the stable state by continuing without changing the power supply source and the mode during the image reading at the second reading speed. Therefore, it is possible to realize the function related to image reading in accordance with the power consumption.

In addition to this, by using the AC adapter as the power supply source after the image reading at the second reading speed is ended, it is possible to change the power supply source to the AC adapter, and to continue the control in the high output mode. Therefore, it is possible to realize the function related to image reading in accordance with the power consumption.

H1. The plurality of types of modes may include a medium output mode. The medium output mode may be a mode configured to be controlled in a coupling state where a medium power-feeding USB device configured to feed power of a power value included within a medium power range is coupled, the medium power range being higher than the low power range and lower than the high power range. The reading section may be configured to read an image at a third reading speed that is faster than the first reading speed and slower than the second reading speed. The control section may be configured not to perform image reading at the second reading speed, and to perform image reading at the first reading speed and the third reading speed, in the medium output mode.

According to this configuration, it is possible to perform control in the medium output mode in addition to the low output mode and the high output mode. Even in the same USB device, the power range of power that can be fed by the USB device and the reading speed in accordance with the power range of power that can be fed can vary. Therefore, it is possible to realize the function related to image reading in accordance with the power consumption.

I1. The image reading apparatus may further include a first tray configured to place an original document before reading, and a first tray drive source configured to move the first tray. The control section may be configured not to drive the first tray drive source in the low output mode, and to drive the first tray drive source in the high output mode.

According to this configuration, since the first tray drive source is not driven in the low output mode having a power range lower than the power range in the high output mode, it is possible to reduce the power consumption. Therefore, it is possible to realize the function related to image reading in accordance with the power consumption.

J1. The image reading apparatus may further include a second tray configured to place an original document after reading, and a second tray drive source configured to move the second tray. The control section may be configured not to drive the second tray drive source in the low output mode, and to drive the second tray drive source in the high output mode.

According to this configuration, since the second tray drive source is not driven in the low output mode having a power range lower than the power range in the high output mode, it is possible to reduce the power consumption. Therefore, it is possible to realize the function related to image reading in accordance with the power consumption.

K1. The image reading apparatus may further include a base, a housing supported by the base, and a housing drive source driven to change a posture of the housing. The control section may be configured not to drive the housing drive source in the low output mode, and to drive the housing drive source in the high output mode.

According to this configuration, since the housing drive source is not driven in the low output mode having a power range lower than the power range in the high output mode, it is possible to reduce the power consumption. Therefore, it is possible to realize the function related to image reading in accordance with the power consumption.

L1. The image reading apparatus may further include a transport section configured to transport an original document, and a carrier sheet sensor that detects a carrier sheet sandwiching an original document. The transport section may be configured to transport the carrier sheet. The control section may be configured to cause the transport section not to transport the carrier sheet in the low output mode, and to cause the transport section to transport the carrier sheet in the high output mode. The control section may disable the carrier sheet sensor in the low output mode and enable the carrier sheet sensor in the high output mode.

According to this configuration, in the low output mode having a power range lower than the high output mode, the carrier sheet, which requires more the transporting force than the original document such as thin paper, is not transported. Thus, it is possible to reduce the power consumption. Further, in the low output mode having a power range lower than the high output mode, it is possible to disable the carrier sheet sensor, and to reduce the power consumption. Therefore, it is possible to realize the function related to image reading in accordance with the power consumption.

M1. The image reading apparatus may further include a transport section configured to transport an original document, and a double feed sensor that detects double feed of an original document. The control section may disable the double feed sensor in the low output mode and enable the double feed sensor in the high output mode.

According to this configuration, in the low output mode having a power range lower than the high output mode, it is possible to disable the double feed sensor and to reduce the power consumption. Therefore, it is possible to realize the function related to image reading in accordance with the power consumption.

N1. The image reading apparatus may further include a sensor that performs detection related to image reading. The control section may be configured to perform control of switching between an enabling period in which the sensor is enabled and a disabling period in which the sensor is disabled, in the low output mode.

According to this configuration, in the low output mode having a power range lower than the high output mode, it is possible to perform switching between the disabling period in which the sensor is disabled and the enabling period in which the sensor is enabled, and to reduce the power consumption. Therefore, it is possible to realize the function related to image reading in accordance with the power consumption.

O1. The control section may perform enumeration for a coupling state with a USB device by using at least one of power-on and a change in the coupling state with the USB device as a trigger, and determine the coupling state with the USB device based on a result of the enumeration.

According to this configuration, it is possible to determine the coupling state with the USB device by using at least one of power-on and a change in the coupling state with the USB device as a trigger. Therefore, it is possible to realize the function related to image reading in accordance with the power consumption.

P1. The image reading apparatus may further include a notification section configured to perform a notification. The notification section may perform a notification of a mode controlled by the control section.

According to this configuration, it is possible to specify the controlled mode by the user. As a result, it is possible to specify the function related to image reading by the user. Therefore, it is possible to improve the convenience of the user.

Q1. A control method of an image reading apparatus including a reading section configured to read an image from an original document, the control method includes performing control in any one of a plurality of types of modes including a low output mode and a high output mode, the low output mode configured to be controlled in a coupling state where a low power-feeding USB device configured to feed power of a power value included within a low power range is coupled, and the high output mode configured to be controlled in a coupling state where a high power-feeding USB device configured to feed power of a power value included within a high power range higher than the low power range is coupled, not performing image reading at a second reading speed faster than a first reading speed and performing image reading at the first reading speed in the low output mode, and performing image reading at the first reading speed and the second reading speed in the high output mode. According to this configuration, it is possible to exhibit the same effect as in A1.

A2. An image reading apparatus including a reading section configured to read an image from an original document, and a control section configured to perform control related to image reading. The control section is configured to perform control in any one of a plurality of types of modes. The plurality of types of modes include a low output mode and a high output mode. The low output mode is a mode configured to be controlled in a coupling state where a low power-feeding USB device configured to feed power of a power value included within a low power range is coupled. The high output mode is a mode configured to be controlled in a coupling state where a high power-feeding USB device configured to feed power of a power value included within a high power range higher than the low power range is coupled. The reading section is configured to read an image at either a first reading speed or a second reading speed faster than the first reading speed. The control section is configured not to perform image reading at the second reading speed and to perform image reading at the first reading speed in the low output mode. The control section is configured to perform image reading at the first reading speed and the second reading speed in the high output mode. The control section is configured to charge a battery configured to feed power and be charged by power feeding from the high power-feeding USB device in a coupling state where the battery is coupled with the high power-feeding USB device, in the high output mode. The control section is configured to not charge the battery by power feeding from the low power-feeding USB device during image reading, and charge the battery by power feeding from the low power-feeding USB device when image reading is not being performed, in a coupling state where the battery and the low power-feeding USB device are coupled in the low output mode.

According to this configuration, even when the power range of power that can be fed varies depending on the USB device, it is possible to read an image at the first reading speed in the same manner. On the other hand, even in the same USB device, it is possible to read an image at the second reading speed faster than the first reading speed, depending on the power range of power that can be fed by the USB device. As described above, it is possible to perform image reading at the reading speed corresponding to the power range of power that can be fed by the USB device. Therefore, it is possible to realize the function related to image reading in accordance with the power consumption.

In addition to this, even in the same USB device, it is possible to make a difference whether or not to charge the battery during image reading, depending on the power range of power that can be fed by the USB device. In particular, in the coupling state in which the low power-feeding USB device in which the power range of power that can be fed is lower than the high power-feeding USB device is coupled, the battery is not charged during the image reading. Thus, it is possible to suppress the power consumption. Therefore, it is possible to realize the function related to image reading in accordance with the power consumption.

B2. The plurality of types of modes may include a medium output mode. The medium output mode may be a mode configured to be controlled in a coupling state where the battery configured to feed power of a power value included within a medium power range is coupled, the medium power range being higher than the low power range and lower than the high power range. The reading section may be configured to read an image at a third reading speed that is faster than the first reading speed and slower than the second reading speed. The control section may be configured not to perform image reading at the second reading speed, and to perform image reading at the first reading speed and the third reading speed in the medium output mode.

According to this configuration, it is possible to perform control in the medium output mode in addition to the low output mode and the high output mode. Power can be fed from the battery, and the types of power supply sources and the reading speed corresponding to the power range of power that can be fed can vary. Therefore, it is possible to realize the function related to image reading in accordance with the power consumption.

C2. The medium output mode may be a mode configured to be controlled in a coupling state where a medium power-feeding USB device configured to feed power of a power value included within the medium power range is coupled.

According to this configuration, it is possible to perform control in the medium output mode in addition to the low output mode and the high output mode. Even in the same USB device, the power range of power that can be fed by the USB device and the reading speed in accordance with the power range of power that can be fed can vary. Therefore, it is possible to realize the function related to image reading in accordance with the power consumption.

D2. The control section may perform control in the medium output mode by using the medium power-feeding USB device as the power supply source when a charging amount of the battery is equal to or smaller than a lower limit amount, in a coupling state where the battery is physically coupled, and the medium power-feeding USB device is coupled.

According to this configuration, when the charging amount of the battery is equal to or smaller than the lower limit amount in a coupling state where the battery is physically coupled and the medium power-feeding USB device is coupled, it is possible to use the medium power-feeding USB device as the power supply source instead of the battery. As a result, it is possible to perform control in the medium output mode without reducing the charging amount of the battery. Therefore, it is possible to realize the function related to image reading in accordance with the power consumption.

E2. The control section may perform control in the medium output mode by using the battery as the power supply source when a charging amount of the battery is equal to or greater than an upper limit amount, in a coupling state where the battery is physically coupled, and the medium power-feeding USB device is coupled.

According to this configuration, when the charging amount of the battery is equal to or greater than the upper limit amount in a coupling state where the battery is physically coupled and the medium power-feeding USB device is coupled, it is possible to use the battery as the power supply source. As a result, it is possible to perform control in the medium output mode by effectively utilizing the power fed from the battery. Therefore, it is possible to realize the function related to image reading in accordance with the power consumption.

F2. The control section may perform control in the low output mode by using the low power-feeding USB device as the power supply source when a charging amount of the battery is equal to or smaller than a lower limit amount, in a coupling state where the battery is physically coupled, and the low power-feeding USB device is coupled.

According to this configuration, when the charging amount of the battery is equal to or smaller than the lower limit amount in a coupling state where the battery is physically coupled and the low power-feeding USB device having a power range lower than the battery is coupled, it is possible to use the low power-feeding USB device as the power supply source instead of the battery. As a result, it is possible to perform control in the low output mode without reducing the charging amount of the battery. Therefore, it is possible to realize the function related to image reading in accordance with the power consumption.

G2. The control section may perform control in the medium output mode by using the battery as the power supply source when a charging amount of the battery is equal to or greater than an upper limit amount, in a coupling state where the battery is physically coupled, and the low power-feeding USB device is coupled.

According to this configuration, when the charging amount of the battery is equal to or greater than the upper limit amount in a coupling state where the battery is physically coupled and the low power-feeding USB device having a power range lower than the battery is coupled, it is possible to use the battery as the power supply source. As a result, it is possible to perform control in the medium output mode by effectively utilizing the power fed from the battery having a power range higher than the low power-feeding USB device. Therefore, it is possible to realize the function related to image reading in accordance with the power consumption.

H2. The control section may be configured to, in the medium output mode, in a coupling state in which the battery and the medium power-feeding USB device are coupled, not charge the battery by power feeding from the medium power-feeding USB device during image reading, and charge the battery by power feeding from the medium power-feeding USB device when an image is not being read.

According to this configuration, even in the same USB device, it is possible to make a difference whether or not to charge the battery during image reading, depending on the power range of power that can be fed by the USB device. In particular, in the coupling state in which the medium power-feeding USB device in which the power range of power that can be fed is lower than the high power-feeding USB device is coupled, the battery is not charged during the image reading. Thus, it is possible to suppress the power consumption. Therefore, it is possible to realize the function related to image reading in accordance with the power consumption.

I2. The plurality of types of modes may include a medium output mode. The medium output mode may be a mode configured to be controlled in a coupling state where the battery configured to feed power of a power value included within a medium power range that is higher than the low power range and lower than the high power range is coupled. The high output mode may be a mode configured to be controlled in a coupling state where the AC adapter configured to feed power of a power value included within the high power range is coupled. The control section may perform control in the high output mode by using the AC adapter as the power supply source when the coupling state is changed from a coupling state where the AC adapter is not coupled, and the battery is coupled, to a coupling state where the AC adapter and the battery are coupled, in the medium output mode.

According to this configuration, when the coupling state where the AC adapter having a power range higher than the battery is coupled has occurred, it is possible to use the AC adapter as the power supply source. As a result, it is possible to perform control in the high output mode by effectively utilizing the power fed from the AC adapter without decreasing the charging amount of the battery. Therefore, it is possible to realize the function related to image reading in accordance with the power consumption.

J2. The image reading apparatus may further include a first tray configured to place an original document before reading, and a first tray drive source configured to move the first tray. The control section may be configured not to drive the first tray drive source in the low output mode, and to drive the first tray drive source in the high output mode.

According to this configuration, since the first tray drive source is not driven in the low output mode having a power range lower than the power range in the high output mode, it is possible to reduce the power consumption. Therefore, it is possible to realize the function related to image reading in accordance with the power consumption.

K2. The image reading apparatus may further include a second tray configured to place an original document after reading, and a second tray drive source configured to move the second tray. The control section may be configured not to drive the second tray drive source in the low output mode, and to drive the second tray drive source in the high output mode.

According to this configuration, since the second tray drive source is not driven in the low output mode having a power range lower than the power range in the high output mode, it is possible to reduce the power consumption. Therefore, it is possible to realize the function related to image reading in accordance with the power consumption.

L2. The image reading apparatus may further include a base, a housing supported by the base, and a housing drive source driven to change a posture of the housing. The control section may be configured not to drive the housing drive source in the low output mode, and to drive the housing drive source in the high output mode.

According to this configuration, since the housing drive source is not driven in the low output mode having a power range lower than the power range in the high output mode, it is possible to reduce the power consumption. Therefore, it is possible to realize the function related to image reading in accordance with the power consumption.

M2. The image reading apparatus may further include a transport section configured to transport an original document, and a carrier sheet sensor that detects a carrier sheet sandwiching the original document. The transport section may be configured to transport the carrier sheet. The control section may be configured to cause the transport section not to transport the carrier sheet in the low output mode, and to cause the transport section to transport the carrier sheet in the high output mode. The control section may disable the carrier sheet sensor in the low output mode and enable the carrier sheet sensor in the high output mode.

According to this configuration, in the low output mode having a power range lower than the high output mode, the carrier sheet, which requires more the transporting force than the original document such as thin paper, is not transported. Thus, it is possible to reduce the power consumption. Further, in the low output mode having a power range lower than the high output mode, it is possible to disable the carrier sheet sensor, and to reduce the power consumption. Therefore, it is possible to realize the function related to image reading in accordance with the power consumption.

N2. The image reading apparatus may further include a transport section configured to transport an original document, and a double feed sensor that detects double feed of an original document. The control section may disable the double feed sensor in the low output mode and enable the double feed sensor in the high output mode.

According to this configuration, in the low output mode having a power range lower than the high output mode, it is possible to disable the double feed sensor and to reduce the power consumption. Therefore, it is possible to realize the function related to image reading in accordance with the power consumption.

O2. The image reading apparatus may further include a sensor that performs detection related to image reading. The control section may be configured to perform control of switching between an enabling period in which the sensor is enabled and a disabling period in which the sensor is disabled, in the low output mode.

According to this configuration, in the low output mode having a power range lower than the high output mode, it is possible to perform switching between the disabling period in which the sensor is disabled and the enabling period in which the sensor is enabled, and to reduce the power consumption. Therefore, it is possible to realize the function related to image reading in accordance with the power consumption.

P2. The control section may perform enumeration for a coupling state with a USB device by using at least one of power-on and a change in the coupling state with the USB device as a trigger, and determine the coupling state with the USB device based on a result of the enumeration.

According to this configuration, it is possible to determine the coupling state with the USB device by using at least one of power-on and a change in the coupling state with the USB device as a trigger. Therefore, it is possible to realize the function related to image reading in accordance with the power consumption.

Q2. The image reading apparatus may further include a notification section configured to perform a notification. The notification section may perform a notification of a mode controlled by the control section.

According to this configuration, it is possible to specify the controlled mode by the user. As a result, it is possible to specify the function related to image reading by the user. Therefore, it is possible to improve the convenience of the user.

R2. A control method of an image reading apparatus including a reading section configured to read an image from an original document, the control method including performing control in any one of a plurality of types of modes including a low output mode and a high output mode, the low output mode configured to be controlled in a coupling state where a low power-feeding USB device configured to feed power of a power value included within a low power range is coupled, and the high output mode configured to be controlled in a coupling state where a high power-feeding USB device configured to feed power of a power value included within a high power range higher than the low power range is coupled, causing an image not to be read at a second reading speed faster than a first reading speed and to be read at the first reading speed in the low output mode, causing an image to be read at the first reading speed and the second reading speed in the high output mode, charging the battery by feeding power from the high power-feeding USB device in a coupling state where a battery configured to feed power and perform charging, and the high power-feeding USB device are coupled in the high output mode and not charging the battery by power feeding from the low power-feeding USB device during image reading and charging the battery by power feeding from the low power-feeding USB device when an image is not being read, in a coupling state in which the battery and the low power-feeding USB device are coupled in the low output mode. According to this configuration, it is possible to exhibit the same effect as in A2.

A3. An image reading apparatus including a reading section configured to read an image from an original document, and a control section configured to perform control related to image reading. The control section is configured to perform control in any one of a plurality of types of modes. The plurality of types of modes include a first mode and a second mode. The first mode is a mode configured to be controlled in a coupling state where a first device configured to feed power of a power value included within a first power range is coupled. The second mode is a mode configured to be controlled in a coupling state where a second device configured to feed power of a power value included within a second power range higher than the first power range is coupled. The control section is configured to execute a reading process of causing the reading section to read an image from an original document and a first wireless output process of outputting image data of the image read by the reading section via first wireless communication. The control section is configured not to execute the first wireless output process before an end of the reading process, and is configured to execute the first wireless output process after the end of the reading process, in the first mode. The control section is configured to execute the first wireless output process even both before and after the end of the reading process, in the second mode.

According to this configuration, in the first mode in which the power range of power that can be fed is lower than that in the second mode, differing from the second mode, the control section does not execute the first wireless output process before the end of the reading process. In this manner, it is possible to adjust the execution trigger of the reading process and the first wireless output process in accordance with the power range of power that can be fed. Therefore, it is possible to realize the function related to image reading in accordance with the power consumption.

B3. The control section may be configured to execute a wired output process of outputting image data of an image read by the reading section via wired communication having power consumption smaller than power consumption of the first wireless communication. In the second mode, when the control section is in a coupling state where both the first wireless communication and the wired communication are enabled, the control section may be configured to execute the wired output process with priority over the first wireless output process.

According to this configuration, in the second mode, when the control section is in a coupling state where both the first wireless communication and the wired communication are enabled, the control section can execute the wired output process having power consumption smaller than the power consumption in the first wireless communication with priority over the first wireless output process. Therefore, it is possible to realize the function related to image reading in accordance with the power consumption.

C3. The wired communication may include USB communication. According to this configuration, it is possible to exhibit the same effect as in B3.

D3. In the first mode, when the control section causes an image to be read from an original document of a plurality of sheets based on an input of a reading instruction, the control section may not execute the first wireless output process before an end of the reading process of reading an image from an original document of a plurality of sheets based on an input of a reading instruction, and may be configured to execute the first wireless output process after the end of the reading process of reading an image from an original document of a plurality of sheets based on the input of a reading instruction.

According to this configuration, in the first mode, the control section can execute the first wireless output process after the reading process of reading an image from an original documents of a plurality of sheets is ended. As described above, in the first mode in which the power range of power that can be fed is lower than the power range in the second mode, it is possible to perform adjustment such that the execution of the reading process and the execution of the first wireless output process do not overlap. Therefore, it is possible to realize the function related to image reading in accordance with the power consumption. Further, it is possible to shorten the time from the start to the end of the reading process of reading an image from an original document of a plurality of sheets.

E3. In the first mode, when an image is read from an original document of a plurality of sheets based on an input of a reading instruction, the control section may not execute the first wireless output process before an end of the reading process of reading an image from each of a plurality of sheets of the original document, and may be configured to execute the first wireless output process after the end of the reading process of reading an image from each of the plurality of sheets of the original document.

According to this configuration, in the first mode, the control section can execute the first wireless output process after the reading process of reading an image from each of a plurality of sheets of the original document is ended. As described above, in the first mode in which the power range of power that can be fed is lower than the power range in the second mode, it is possible to perform adjustment such that the execution of the reading process and the execution of the first wireless output process do not overlap. Therefore, it is possible to realize the function related to image reading in accordance with the power consumption. Further, it is possible to accelerate the execution timing of the first wireless communication for outputting the image data of the image read from each of the plurality of sheets of the original document.

F3. The control section may include an image data storage section configured to store image data of an image read from an original document of a predetermined number of sheets by the reading section. In the first mode, when an image is read from the original document of a plurality of sheets based on an input of a reading instruction, the control section may not execute the first wireless output process before an end of the reading process of reading an image from the predetermined number of sheets in the original document of the plurality of sheets, and the control section may be configured to execute the first wireless output process after the end of the reading process of reading an image from the predetermined number of sheets in the original document of the plurality of sheets.

According to this configuration, in the first mode, the control section can execute the first wireless output process after an end of the reading process of reading an image from a predetermined number of sheets in the original document of a plurality of sheets. As described above, in the first mode in which the power range of power that can be fed is lower than the power range in the second mode, it is possible to perform adjustment such that the execution of the reading process and the execution of the first wireless output process do not overlap. Therefore, it is possible to realize the function related to image reading in accordance with the power consumption. Further, it is possible to shorten the time from the start to the end of the reading process of reading an image from a predetermined number of sheets in the original document of a plurality of sheets. In addition, it is possible to execute the first wireless output process at a timing in consideration of the data volume of image data for a predetermined number of sheets that can be stored in the image data storage section.

G3. The plurality of types of modes include a third mode. The third mode is a mode configured to be controlled in a coupling state where a third device configured to feed power of a power value included within a third power range lower than the first power range is coupled. The control section may be configured to execute a second wireless output process of outputting image data of an image read by the reading section via a second wireless communication having power consumption smaller than the first wireless communication. The control section may not execute the first wireless output process and execute the second wireless output process in the third mode.

According to this configuration, in a third mode in which the power range of power that can be fed is lower than the power range in the first mode, the control section does not execute the first wireless output process and may be configured to execute the second wireless output process having power consumption smaller than the first wireless communication. In this manner, it is possible to adjust the type of wireless communication in accordance with the power range of power that can be fed. Therefore, it is possible to realize the function related to image reading in accordance with the power consumption.

H3. The control section may be configured to execute a polling process for recognizing the first wireless communication as an enabled coupling state. The control section may include a capacitor having a capacitance capable of supplementing the power consumption by the execution of the polling process.

According to this configuration, it is possible to execute the polling process for recognizing the first wireless communication as an enabled coupling state, by using the capacitor having a capacitance capable of supplementing the power consumption by the execution of the polling process. Therefore, it is possible to realize the function related to image reading in accordance with the power consumption.

I3. The first apparatus may include a low power-feeding USB device capable of feeding power to a power value included in the first power range. The second device may include a high power-feeding USB device capable of feeding power of a power value included within the second power range. According to this configuration, it is possible to exhibit the same effect as in A3.

J3. The third device may include a medium power-feeding USB device configured to feed power of a power value included within the third power range. According to this configuration, it is possible to exhibit the same effect as in G3.

K3. There is provided a control method of an image reading apparatus including a reading section configured to read an image from an original document. The control method includes performing control in any one of a plurality of types of modes including a first mode and a second mode, the first mode configured to be controlled in a coupling state where a first device capable of feeding power of a power value within a first power range is coupled, and the second mode configured to be controlled in a coupling state where a second device capable of feeding power of a power value included within a second power range lower than the first power range is coupled, not performing a first wireless output process of outputting image data of an image read by the reading section before an end of a reading process of reading an image from an original document by the reading section and performing the first wireless output process after the end of the reading process in the first mode, and performing the first wireless output process both before and after the end of the reading process in the second mode. According to this configuration, it is possible to exhibit the same effect as in A3.

What is claimed is:

1. An image reading apparatus comprising:
a reading section configured to read an image from an original document; and
a control section configured to perform control related to image reading, wherein
the control section is configured to perform control in any one of a plurality of types of modes,
the plurality of types of modes include a low output mode and a high output mode,
the low output mode is a mode configured to be controlled in a coupling state where a low power-feeding USB device configured to feed power of a power value included within a low power range is coupled,
the high output mode is a mode configured to be controlled in a coupling state where a high power-feeding USB device configured to feed power of a power value included within a high power range higher than the low power range is coupled,
the reading section is configured to read an image at either a first reading speed or a second reading speed faster than the first reading speed,
the control section is configured not to perform image reading at the second reading speed and to perform image reading at the first reading speed in the low output mode, and
the control section is configured to perform image reading at the first reading speed and the second reading speed in the high output mode.

2. The image reading apparatus according to claim 1, wherein
the high output mode is a mode configured to be controlled in a coupling state where an AC adapter configured to feed the power of the power value included within the high power range is coupled.

3. The image reading apparatus according to claim 2, wherein
the control section
performs control in the high output mode by using the AC adapter as a power supply source in a coupling state where the AC adapter and the high power-feeding USB device are coupled, and
continues the control in the high output mode by using the high power-feeding USB device as the power supply source when a coupling state is changed from the coupling state where the AC adapter and the high power-feeding USB device are coupled, to a coupling state where the high power-feeding USB device is coupled, but the AC adapter is not coupled in the high output mode.

4. The image reading apparatus according to claim 2, wherein
the control section
performs control in the high output mode by using the AC adapter as a power supply source in a coupling state where the AC adapter and the low power-feeding USB device are coupled, and stops image reading at the second reading speed when a coupling state is changed from the coupling state where the AC adapter and the low power-feeding USB device are coupled, to a coupling state where the low power-feeding USB device is coupled, but the AC adapter is not coupled during the image reading at the second reading speed in the high output mode.

5. The image reading apparatus according to claim 2, wherein
the control section
performs control in the high output mode by using the AC adapter as a power supply source in a coupling state where the AC adapter and the low power-feeding USB device are coupled, and
stops image reading at the first reading speed when a coupling state is changed from the coupling state where the AC adapter and the low power-feeding USB device are coupled, to a coupling state where the low power-feeding USB device is coupled, but the AC adapter is not coupled during the image reading at the first reading speed in the high output mode.

6. The image reading apparatus according to claim 2, wherein
the control section
performs control in the low output mode by using the low power-feeding USB device as a power supply source in a coupling state where the low power-feeding USB device is coupled without the AC adapter coupled, and
continues the control in the low output mode by continuously using the low power-feeding USB device as the power supply source when a coupling state is changed from the coupling state where the low power-feeding USB device is coupled without the AC adapter coupled, to a coupling state where the AC adapter and the low power-feeding USB device are coupled during image reading at the first reading speed in the low output mode, and performs control in the high output mode by using the AC adapter as the power supply source, after image reading at the first reading speed is ended.

7. The image reading apparatus according to claim 2, wherein
the control section
performs control in the high output mode by using the high power-feeding USB device as a power supply source in a coupling state where the high power-feeding USB device is coupled without the AC adapter coupled, and
continues the control in the high output mode by continuously using the high power-feeding USB device as the power supply source when a coupling state is changed from the coupling state where the high power-feeding USB device is coupled without the AC adapter coupled, to a coupling state where the AC adapter and the high power-feeding USB device are coupled during image reading at the second reading speed in the high output mode, and continues the control in the high output mode by using the AC adapter as the power supply source, after the image reading at the second reading speed is ended.

8. The image reading apparatus according to claim 1, wherein
the plurality of types of modes include a medium output mode,
the medium output mode is a mode configured to be controlled in a coupling state where a medium power-feeding USB device configured to feed power of a power value included within a medium power range is coupled, the medium power range being higher than the low power range and lower than the high power range,
the reading section is configured to read an image at a third reading speed that is faster than the first reading speed and slower than the second reading speed, and
the control section is configured not to perform image reading at the second reading speed, and to perform image reading at the first reading speed and the third reading speed in the medium output mode.

9. The image reading apparatus according to claim 1, further comprising:
a first tray configured to place an original document before reading; and
a first tray drive source configured to move the first tray, wherein
the control section is configured not to drive the first tray drive source in the low output mode, and to drive the first tray drive source in the high output mode.

10. The image reading apparatus according to claim 1, further comprising:
a second tray configured to place an original document after reading; and
a second tray drive source configured to move the second tray, wherein
the control section is configured not to drive the second tray drive source in the low output mode, and to drive the second tray drive source in the high output mode.

11. The image reading apparatus according to claim 1, further comprising:
a base;
a housing supported by the base; and
a housing drive source driven to change a posture of the housing, wherein
the control section is configured not to drive the housing drive source in the low output mode, and to drive the housing drive source in the high output mode.

12. The image reading apparatus according to claim 1, further comprising:
a transport section configured to transport an original document; and
a carrier sheet sensor that detects a carrier sheet sandwiching an original document, wherein
the transport section is configured to transport the carrier sheet,
the control section is configured to cause the transport section not to transport the carrier sheet in the low output mode, and to cause the transport section to transport the carrier sheet in the high output mode, and
the control section disables the carrier sheet sensor in the low output mode and enables the carrier sheet sensor in the high output mode.

13. The image reading apparatus according to claim 1, further comprising:
a transport section configured to transport an original document; and
a double feed sensor that detects double feed of an original document, wherein
the control section disables the double feed sensor in the low output mode and enables the double feed sensor in the high output mode.

14. The image reading apparatus according to claim 1, further comprising:

a sensor that performs detection related to image reading, wherein the control section is configured to perform control of switching between an enabling period in which the sensor is enabled and a disabling period in which the sensor is disabled, in the low output mode.

15. The image reading apparatus according to claim 1, wherein the control section perform enumeration for a coupling state with a USB device by using at least one of power-on and a change in the coupling state with the USB device as a trigger, and determines the coupling state with the USB device based on a result of the enumeration.

16. The image reading apparatus according to claim 1, further comprising:

a notification section configured to perform a notification, wherein the notification section performs a notification of a mode controlled by the control section.

17. The image reading apparatus according to claim 1, wherein the control section is configured to charge a battery configured to feed power and be charged by power feeding from the high power-feeding USB device in a coupling state where the battery and the high power-feeding USB device are coupled in the high output mode, and the control section is configured not to charge the battery by power feeding from the low power-feeding USB device during image reading, and to charge the battery by power feeding from the low power-feeding USB device when image reading is not being performed, in a coupling state in which the battery and the low power-feeding USB device are coupled in the low output mode.

18. A control method of an image reading apparatus including a reading section configured to read an image from an original document, the control method comprising:

performing control in any one of a plurality of types of modes including a low output mode and a high output mode, the low output mode configured to be controlled in a coupling state where a low power-feeding USB device configured to feed power of a power value included within a low power range is coupled, and the high output mode configured to be controlled in a coupling state where a high power-feeding USB device configured to feed power of a power value included within a high power range higher than the low power range is coupled;

not performing image reading at a second reading speed faster than a first reading speed and performing image reading at the first reading speed in the low output mode; and performing image reading at the first reading speed and the second reading speed in the high output mode.

* * * * *